United States Patent
Higuchi

(10) Patent No.: US 7,195,276 B2
(45) Date of Patent: Mar. 27, 2007

(54) OCCUPANT PROTECTION SYSTEM

(75) Inventor: Masahiro Higuchi, Shiga (JP)

(73) Assignee: Takata Corporation, Tokyo (JP)

( * ) Notice: Subject to any disclaimer, the term of this patent is extended or adjusted under 35 U.S.C. 154(b) by 301 days.

(21) Appl. No.: 10/878,688

(22) Filed: Jun. 29, 2004

(65) Prior Publication Data
US 2005/0023806 A1 Feb. 3, 2005

(30) Foreign Application Priority Data
Jul. 31, 2003 (JP) .............................. 2003-204682
Sep. 30, 2003 (JP) .............................. 2003-340823
Apr. 21, 2004 (JP) .............................. 2004-125682

(51) Int. Cl.
*B60R 21/16* (2006.01)
(52) U.S. Cl. ................ 280/730.1; 280/729; 280/743.1
(58) Field of Classification Search ............. 280/728.1, 280/728.2, 730.1, 738, 729, 743.1; *B60R 21/20*
See application file for complete search history.

(56) References Cited

U.S. PATENT DOCUMENTS

| | | | | |
|---|---|---|---|---|
| 5,458,367 A | * | 10/1995 | Marts et al. | 280/730.1 |
| 5,772,238 A | * | 6/1998 | Breed et al. | 280/728.2 |
| 6,431,586 B1 | * | 8/2002 | Eyrainer et al. | 280/730.1 |
| 6,502,859 B1 | * | 1/2003 | Svetlik | 280/749 |
| 6,695,342 B2 | * | 2/2004 | Tanase et al. | 280/730.2 |

FOREIGN PATENT DOCUMENTS

| | | | |
|---|---|---|---|
| EP | 1 279 568 | | 1/2003 |
| GB | 1 370 575 | | 10/1974 |
| GB | 2345669 A | * | 7/2000 |
| GB | 2364674 A | * | 2/2002 |
| JP | 10264761 | | 10/1998 |

* cited by examiner

*Primary Examiner*—Lesley D. Morris
*Assistant Examiner*—Tiffany Web
(74) *Attorney, Agent, or Firm*—Manabu Kanesaka

(57) ABSTRACT

An occupant protection system for protecting an occupant includes a deployable body for deploying downwardly from above in a vehicle cabin into a vertically and laterally deployed state. A bag is provided to the deployable body to be inflated to a predetermined size for receiving the occupant after the deployable body deploys downwardly by a predetermined length. A gas generator is attached to the bag for inflating the bag.

7 Claims, 19 Drawing Sheets

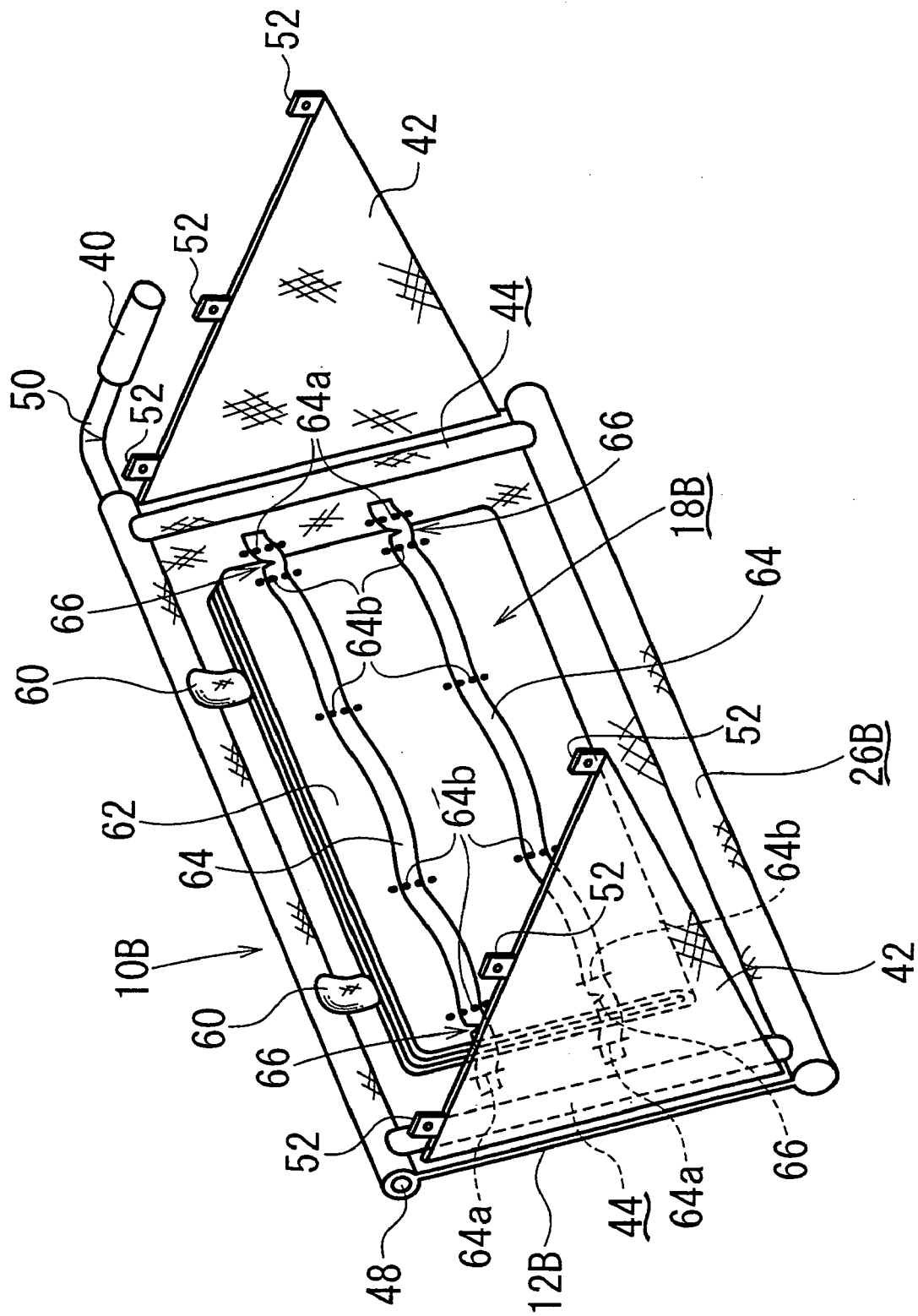

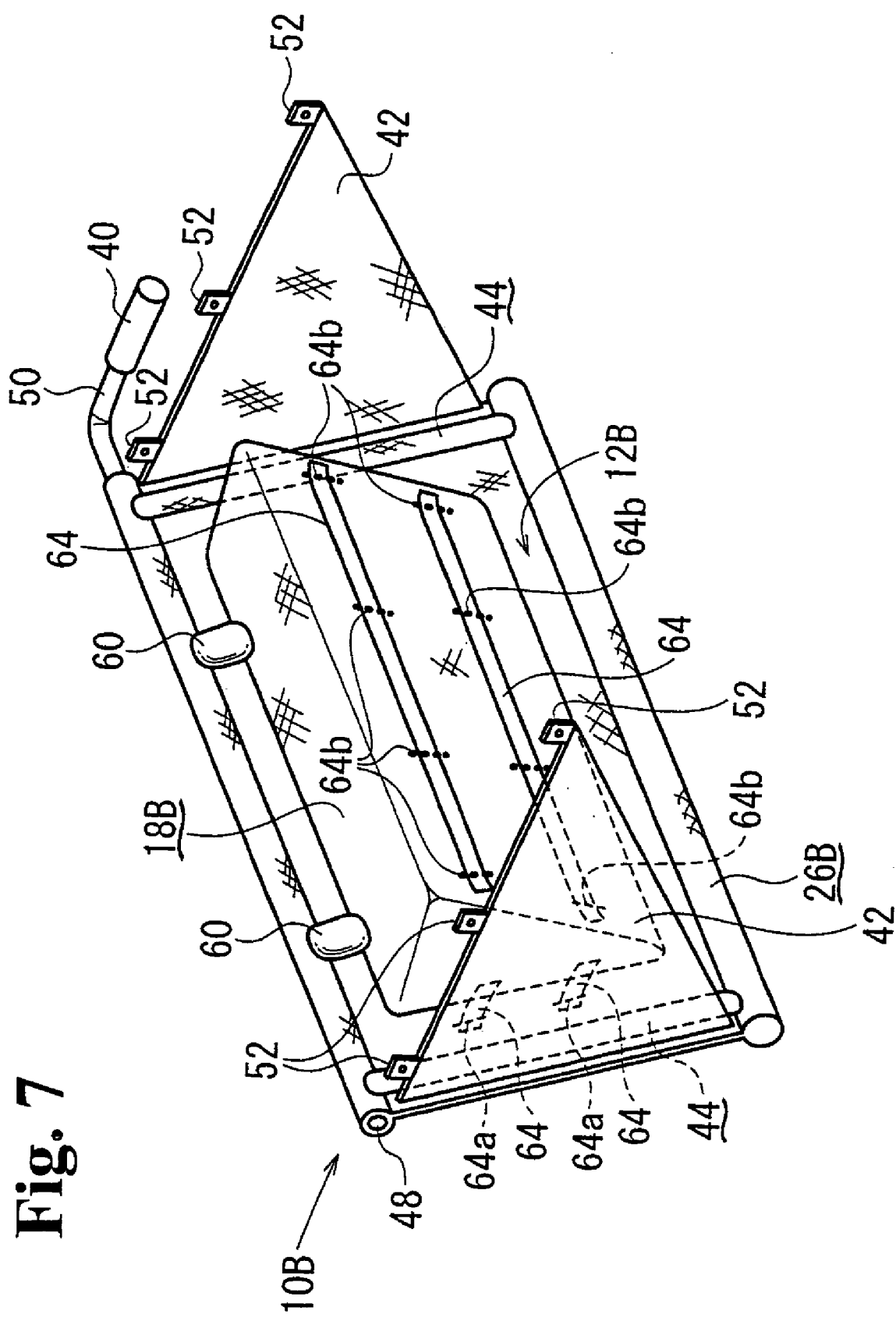

OCCUPANT PROTECTION SYSTEM

BACKGROUND OF THE INVENTION AND RELATED ART STATEMENT

The present invention relates to an occupant protection system for protecting an occupant in a car in the event of a front crash and, more specifically, relates to an occupant protection system including a deployable body that deploys vertically and horizontally in a vehicle cabin.

Airbag systems are widely used as occupant protection systems for protecting a vehicle occupant in the event of a car crash. Japanese Patent Publication (Kokai) No. 10-264761 has disclosed an airbag system in which an airbag is inflated downwardly from a ceiling of a cabin toward a front of a rear seat. The rear-seat airbag system disclosed in Japanese Patent Publication (Kokai) No. 10-264761 sufficiently protects an occupant with a large-capacity airbag filling a space in front of the occupant. However, the system requires an extremely high-output gas generator. The rear-seat airbag system also requires a space sufficient for the airbag to be inflated in front of the occupant. It is therefore difficult to apply the system to a case in which a space in front of the occupant is limited.

In view of the problems described above, an object of the present invention is to provide an occupant protection system that inflates an airbag sufficiently early even with a relatively low-output gas generator and capable of sufficiently protecting an occupant.

Another object of the invention is to provide an occupant protection system applicable even if a space ahead of the occupant is limited.

Further objects and advantages of the invention will be apparent from the following description of the invention.

SUMMARY OF THE INVENTION

To attain the objects described above, according to a first aspect of the present invention, an occupant protection system includes a deployable body capable of deploying downwardly from above in a vehicle cabin into a vertically and laterally deployed state; a bag provided in the deployable body to be inflated for receiving an occupant; and a gas generator for inflating the bag. The bag is inflated to a specified size after the deployable body deploys downwardly by a specified length.

According to a second aspect of the present invention, the occupant protection system in the first aspect further includes deploying means for deploying the deployable body. When the deploying means starts operating, the gas generator is actuated after a specified period of time.

According to a third aspect of the present invention, the occupant protection system in the first aspect further includes a deploying inflatable chamber for inflating the deployable body to deploy. The bag is inflated after the deploying inflatable chamber is inflated.

According to a fourth aspect of the present invention, in the occupant protection system in the third aspect, the gas generator is arranged to supply gas to the deploying inflatable chamber. The occupant protection system further includes gas communicating means for introducing gas in the deploying inflatable chamber into the bag.

According to a fifth aspect of the present invention, in the occupant protection system in the fourth aspect, the gas communicating means includes valve means opening to introduce gas from the deploying inflatable chamber into the bag when a gas pressure in the deploying inflatable chamber exceeds a specified value.

According to a sixth aspect of the present invention, in the occupant protection system in the fourth aspect, a lower part of the deploying inflatable chamber communicates with a lower part of the bag at a lower part of the deployable body.

According to a seventh aspect of the present invention, the occupant protection system in the first aspect further includes inflation-thickness limitation means for limiting a thickness of the bag when the bag is inflated.

According to an eighth aspect of the present invention, in the occupant protection system of the first aspect, the deployable body deploys when the bag is inflated. The occupant protection system further includes inflation-thickness limitation means for limiting a thickness of the bag when the bag is inflated until a gas pressure in the bag reaches a specified value and for stopping limiting the thickness of the bag when the gas pressure reaches the specified value.

According to a ninth aspect of the present invention, in the occupant protection system in one of the first to eighth aspects, the deployable body deploys downwardly from a cabin ceiling.

According to a tenth aspect of the present invention, the occupant protection system in the ninth aspect further includes joints for joining left and right sides of the deployable body with left and right side rims of a ceiling extending from the deployable body toward a rear of the vehicle or portions connected thereto, respectively, when the deployable body deploys.

According to an eleventh aspect of the present invention, the occupant protection system in the ninth or tenth aspect further includes engaging means for engaging an upper part of the bag adjacent to the occupant with a cabin ceiling when the bag is inflated.

According to a twelfth aspect of the present invention, in the occupant protection system in the eleventh aspect, the engaging means includes a guide member extending in a direction that the bag is inflated and a movable body capable of moving along the guide member. The upper part of the bag adjacent to the occupant is connected to the movable body.

According to a thirteenth aspect of the present invention, in the occupant protection system in the twelfth aspect, the guide member and the movable body comprise one-way means for allowing the movable body to move in the direction of inflation of the bag and preventing movement in the opposite direction.

According to a fourteenth aspect of the present invention, in the occupant protection system in the thirteenth aspect, the one-way means allows the movable body to move in the opposite direction when the movable body receives force greater than a specified value in the opposite direction.

According to a fifteenth aspect of the present invention, the occupant protection system in one of the first to fourteenth aspects further includes a vent hole for discharging gas from the bag.

In the occupant protection system of the present invention, it is possible to receive the occupant with the deployable body having the bag for protection. Since the bag receives the occupant, the reaction force during the reception can be decreased. In the invention, the bag is inflated after the deployable body deploys downwardly by a specified length or more. Therefore, even if a space ahead of the occupant is limited, the deployable body enters the space from above and the bag is inflated to reliably receive the occupant from front.

In the second aspect, the system includes the deploying means for deploying the deployable body. After a specified time has elapsed since the deploying means starts operation, the gas generator is actuated. With such a structure, the bag can be inflated to a specified size or more after the deploying means deploys downwardly by a specified length or more.

In the third aspect, the system includes the deploying inflatable chamber for inflating the deployable body to deploy. The bag is inflated after the deploying inflatable chamber is inflated. The occupant protection system with such a structure can have a simple deployment mechanism as compared with a system deploying the deployable body with a drawing mechanism. Since gas emitted from the gas generator is introduced into the bag from the deploying inflation chamber through the gas communicating means in the fourth aspect, the deploying inflation chamber and the bag can be inflated with a common gas generator.

In that case, the gas communicating means may include the valve means opening to introduce gas from the deploying inflatable chamber into the bag when the gas pressure in the deploying inflatable chamber exceeds a specified level as in the fifth aspect. The lower part of the deploying inflatable chamber may communicate with the lower part of the bag in the lower part of the deployable body as in the sixth aspect. Accordingly, it is possible to fully inflate the inflatable chamber, thereby reliably deploying the deployable body downwardly to a specified length or more.

In the seventh aspect, the system further includes the inflation-thickness limitation means for limiting the inflation thickness of the bag. Accordingly, even if the space ahead of the occupant is limited, the bag can surely enter the space to be inflated therein. The limitation of the inflation thickness of the bag promotes the inflation of the bag. The limitation of the inflation thickness of the bag also hardens the inflated bag, thereby allowing the bag to receive the occupant reliably.

In the eight aspect, the deployable body deploys with the inflation of the bag and the system further includes the inflation-thickness limitation means for limiting the inflation thickness of the bag until the gas pressure in the bag reaches a specified level and for stopping the limitation when the gas pressure reaches the specified level. With such a structure, the inflation thickness of the bag is limited until the gas pressure in the bag reaches a specified level. Accordingly, the bag is inflated with a small thickness to deploy the deployable body. Accordingly, even if the space ahead of the occupant is narrow, the deployable body surely enters the space from above. When the gas pressure in the bag reaches a specified level, the limitation of the inflation thickness of the bag is stopped to increase the inflation thickness of the bag.

In the ninth aspect, the deployable body deploys downwardly from the cabin ceiling. With such a structure, the deployable body can surely deploys in a wide range ahead of the upper body of the occupant.

In tenth aspect, the system may further include joints for joining the left and right sides of the deployed deployable body with the left and right side rims of the ceiling extending toward the rear of the vehicle from the deployable body or the portions connected thereto, respectively. With such a structure, the left and right sides of the deployable body are joined with the left and right side rims of the ceiling extending toward the rear of the vehicle from the deployable body or portions connected thereto (for example, vicinity portions, i.e. an upper part of a pillar such as a C-pillar). Accordingly, when the occupant strikes against the deployable body, the deployable body can reliably receive the occupant without retracting toward the front of the vehicle.

In the eleventh aspect, the system includes the engaging means for engaging the upper part of the inflated bag adjacent to the occupant with the cabin ceiling when the deployable body deploys downwardly from the cabin ceiling. Accordingly, it is possible to prevent the bag from retracting from the occupant when the occupant strikes against the deployable body.

In the twelfth aspect, the engaging means includes the guide member extending in the direction of inflation of the bag and the movable body capable of moving along the guide member. The upper part of the bag adjacent to the occupant is connected to the movable body. When the bag is inflated, the movable body also moves along the guide member with the inflation of the bag. Since the guide member extends in the direction of the inflation of the bag, the guide member guides the bag through the movable body to reliably inflate toward the occupant. The inflated bag engages the cabin ceiling through the movable body and the guide member.

In the thirteenth aspect, the guide member and the movable body include the one-way means for allowing the movable body to move in the direction of inflation of the bag and preventing movement in the opposite direction. Accordingly, after the bag is inflated and guided toward the occupant by the guide member, the movement in the opposite direction is prevented, thereby preventing the bag from retracting from the occupant when the occupant strikes against the inflated bag.

In the fourteenth aspect, the one-way means is constructed to allow the movable body to move (retract) in the direction opposite to the inflation direction of the bag when the specified force or greater is applied in the opposite direction. Accordingly, when the occupant strikes against the inflated bag, the movable body is retracted from the occupant with the force, thereby reducing impact to the occupant. The upper part of the bag adjacent to the occupant may directly engage the cabin ceiling without the guide member and the movable body, thereby making an engagement structure between the bag and the cabin ceiling simple.

In the fifteenth aspect, the vent hole is provided for discharging gas from the bag. Accordingly, gas flows out from the bag through the vent hole, thereby absorbing impact applied to the occupant when the inflated bag receives the occupant.

BRIEF DESCRIPTION OF THE DRAWINGS

FIGS. 1(a) and 1(b) are perspective views of an occupant protection system according to an embodiment of the present invention, wherein FIG. 1(a) shows a state that a deployable body does not deploy, and FIG. 1(b) shows a state that the deployable body deploys;

FIG. 6 is a perspective view of an occupant protection system according to a further embodiment of the present invention in a state that a bag is not inflated;

FIG. 7 is a perspective view of the occupant protection system shown in FIG. 6 in a state that a bag is inflated;

FIGS. 13(a) and 13(b) are sectional views of the occupant protection system shown in FIG. 12, wherein FIG. 13(a) shows a state that the bag is not inflated, and FIG. 13(b) shows a state that the bag is inflated;

DETAILED DESCRIPTION OF PREFERRED EMBODIMENTS

Figure 1A:
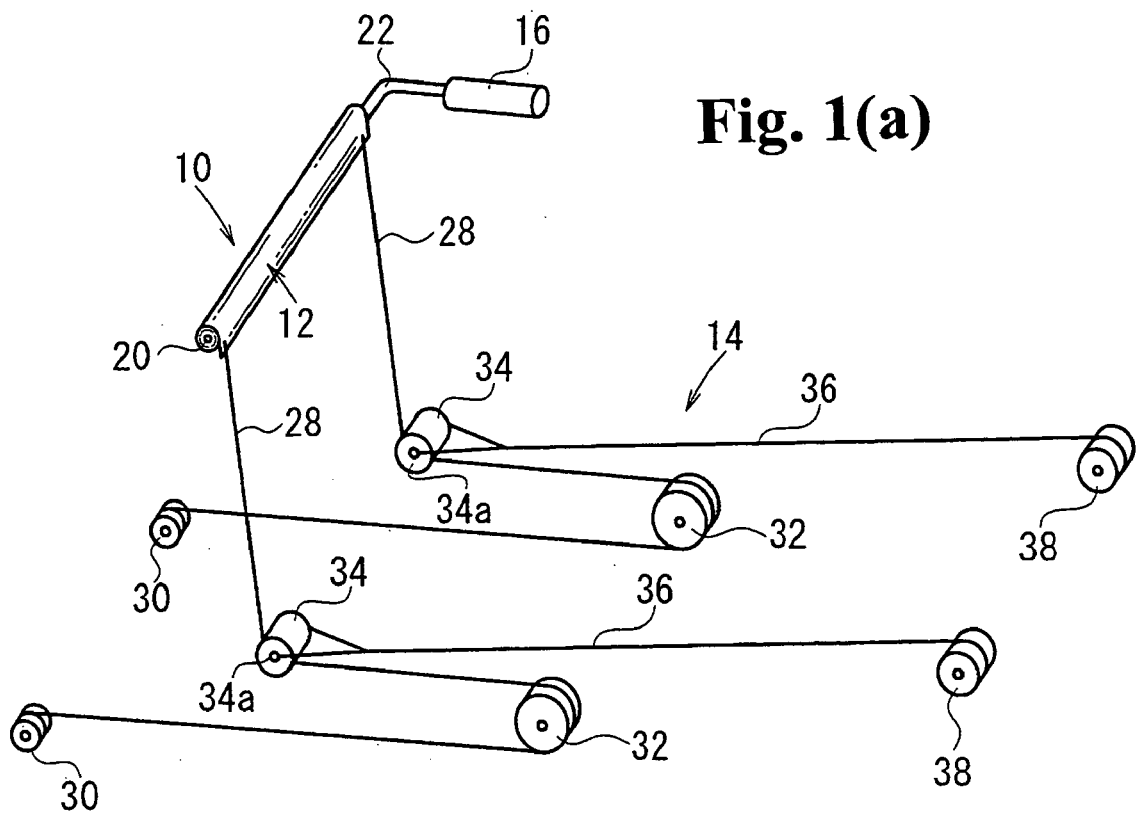
Figure 1B:
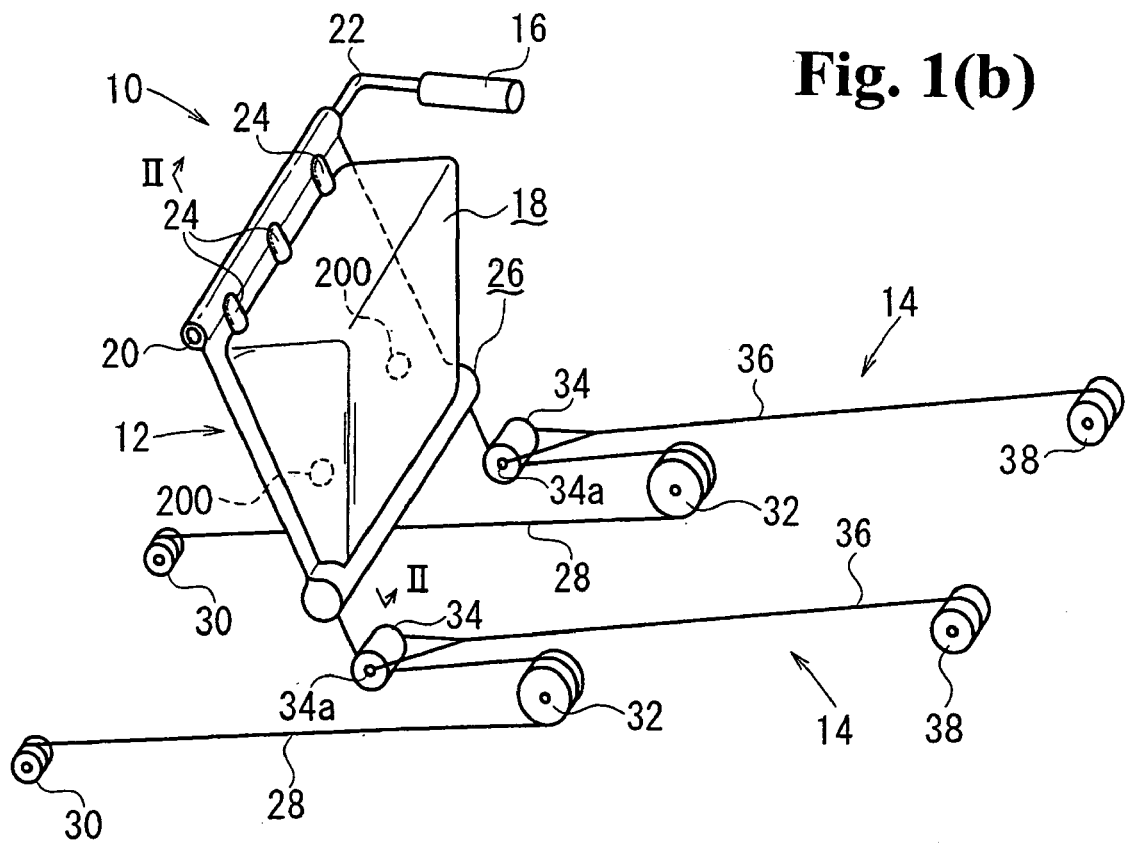
Figure 2A:
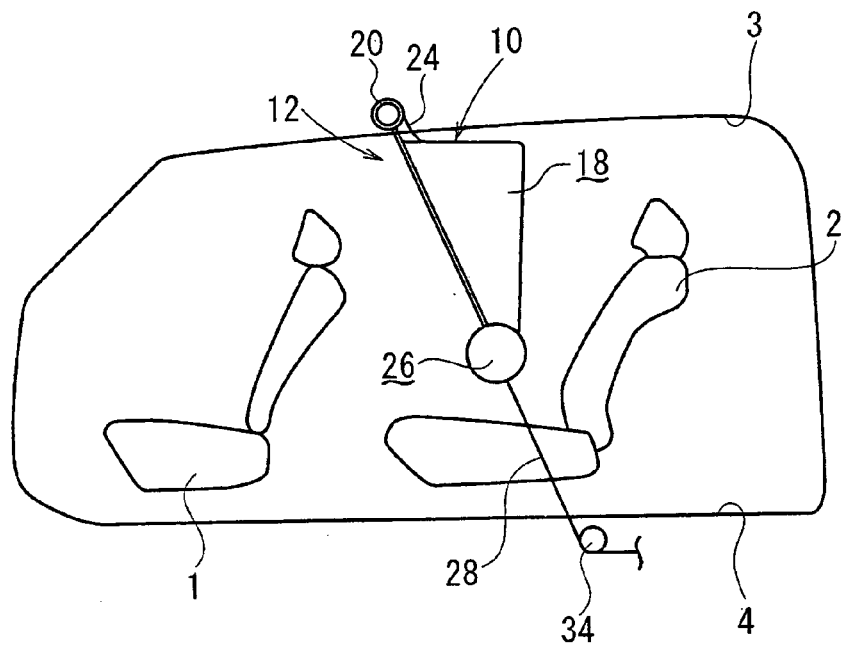
FIGS. 2(a) and 2(b) are schematic side views of an interior of a vehicle including the occupant protection system.
Figure 2B:
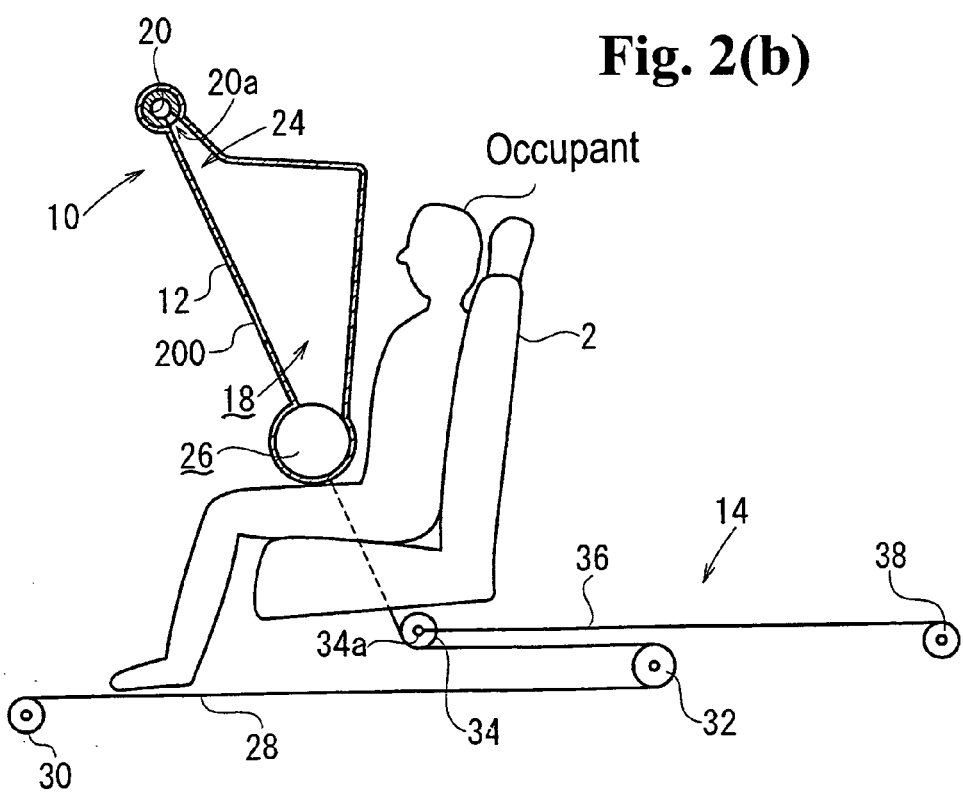

Hereunder, embodiments of the present invention will be described with reference to the accompanying drawings. FIG. 1(a) is a perspective view of an occupant protection system 10 according to an embodiment of the present invention in a state that a deployable body 12 does not deploy. FIG. 1(b) is a perspective view of the deployable body 12 of the occupant protection system 10 in a deployed state. FIG. 2(a) is a schematic side view of an interior of a vehicle including the occupant protection system 10. FIG. 2(b) is an enlarged view of FIG. 2(a).

As shown in FIG. 2(a), a front seat 1 and a rear seat 2 are installed in the vehicle cabin. The deployable body 12 of the occupant protection system 10 is mounted between upper ends of left and right pillars (not shown) of a ceiling 3 in a wound state. The deployable body 12 deploys downwardly from the ceiling 3 vertically and horizontally in the vehicle cabin, in front of the upper body of an occupant seated in the rear seat 2.

The occupant protection system 10 includes the deployable body 12, a draw gear 14 for deploying the deployable body 12, a gas generator 16, and a controller (not shown) for controlling an operation of the draw gear 14 and the gas generator 16. The deployable body 12 includes a bag 18 to be inflated with gas supplied from the gas generator 16 for receiving the occupant. The bag 18 is inflated so as to protrude from a front surface (adjacent to the occupant) of the deployable body 12 toward the occupant seated in the rear seat 2 (rear of the vehicle) in a region of the deployable body 12 facing the upper body of the occupant.

As shown in FIGS. 1(b), 2(a), and 2(b), the deployable body 12 is formed in an approximately rectangular sheet shape with a small thickness, and an upper rim thereof is joined with a take-up shaft 20. The take-up shaft 20 extends in the width direction of the vehicle (laterally) along the ceiling 3. The ceiling 3 mounts a cover (not shown) for covering the deployable body 12 in the wound state. When the deployable body 12 deploys, the cover is constructed to tear open to allow the deployable body 12 to deploy downwardly (into the vehicle cabin).

The take-up shaft 20 is formed in a hollow tube, and one end thereof is connected to the gas generator 16 through a hollow rotatable joint (not shown) and a duct (pipe) 22. The duct 22 and the gas generator 16 are disposed along a side rim of the ceiling 3. Gas passages 24 extend between the take-up shaft 20 and the bag 18 for leading gas in the take-up shaft 20 supplied from the gas generator 16 into the bag 18. As shown in FIG. 2(b), the take-up shaft 20 has a vent hole 20a communicating with the gas passages 24.

In this embodiment, an oblong bag 26 extends in the width direction of the vehicle along a lower rim of the deployable body 12. A lower part of the bag 18 is connected to the oblong bag 26. Vent holes 200 are provided for discharging gas in the inflated bag 18 to the exterior. It is desirable that the vent holes 200 be disposed at positions where a backrest, a headrest of the front seat 1 or a body of the occupant in the rear seat 2 falling onto the bag 18 does not block the vent holes 200, and also gas flowing out of the vent holes 200 does not blow the occupants in the rear seat 2 and the front seat 1.

In this embodiment, the front seat 1 is constructed of two seats arranged laterally apart from each other. Accordingly, as shown in FIGS. 1(b) and 2(b), the vent holes 200 are located at a lower center of each of left and right half of the deployable body 12 opposite to the bag 18 facing the occupant, in other words, at positions facing a lower center of the back of the backrest of each seat of the front seat 1, when the deployable body 12 fully deploys. With such an arrangement, gas flowing out from the vent holes 200 blows onto the lower center of the back of the backrest of each seat of the front seat 1, thereby preventing gas from blowing onto the rear-seat occupant and the front-seat occupant.

The backrest of each seat of the front seat 1 is closer to the rear of the vehicle at the upper part (closer to headrest). In other words, the backrest is apart from the deployed deployable body 12 at the lower part thereof, thereby preventing the vent holes 200 from being closed by the backrest or the headrest. Since the vent holes 200 are provided in the deployable body 12 opposite to the bag 18 facing the rear-seat occupant, the vent holes 200 are prevented from being closed by the body of the rear-seat occupant falling onto the bag 18. The vent holes 200 may connect the inside and outside of the bag 18 all the time or, alternatively, may be closed until the inner pressure of the bag 18 exceeds a specified level.

The draw gear 14 is constructed to draw down left and right ends of the lower rim of the deployable body 12. The draw gear 14 includes a first wire 28 having one end connected to each of the left and right lower ends of the deployable body 12; a first reel 30 for winding the other end of the first wire 28; a fixed pulley 32 on which an intermediate part of the first wire 28 is looped; a moving pulley 34 on which an intermediate part of the first wire 28 closer to the deployable body 12 relative to the fixed pulley 32 is looped; a second wire 36 having one end connected to the rotating shaft 34a of the moving pulley 34; and a second reel 38 for winding the other end of the second wire 36. The first reel 30, the fixed pulley 32, the moving pulley 34, and the second reel 38 are disposed on each of the left and right sides of the floor 4 of the vehicle cabin.

When the deployable body 12 is in a non-deployed state, the moving pulley 34 is disposed in the vicinity of a base of a B-pillar. The moving pulley 34 is biased toward the front of the vehicle by a spring (not shown). The moving pulley 34 is guided by a guide member (not shown) to be able to move from the base of the B-pillar to the rear of the vehicle.

As shown in FIG. 2(b), the fixed pulley 32 is placed adjacent to the rear side of the vehicle closer than the moving pulley 34. The first reel 30 is placed closer to the front of the vehicle relative to the fixed pulley 32. The second reel 38 is placed closer to the rear of the vehicle relative to the moving pulley 34.

As shown in FIG. 1(a), when the deployable body 12 is in a non-deployed state, the first wire 28 extends along the B-pillar and is covered with a cover (not shown) mounted to the B-pillar. A part of the first wire 28 extending along the floor 4 is also covered with a cover (not shown). The covers each has a torn-open portion that is torn open when the first wire 28 is drawn toward the rear of the vehicle to allow the first wire 28 to move toward the rear of the vehicle. The reels 30 and 38 each is connected to a rotation driving unit (not shown). Since the rotation driving unit is driven by explosive, a motor, etc., the reels 30 and 38 can quickly wind the wires 28 and 36, respectively.

Each draw gear 14 includes a sensor for sensing a length of the first wire 28 wound by the first reel 30. The sensor may have any structure. For example, it may include a counter for counting the number of rotations of the first reel 30 to calculate the wound length of the first wire 28 from the count of the counter after the rotation driving unit of the first reel 30 starts an operation.

When a crash sensor (not shown) detects a car crash, the controller immediately activates the rotation driving units of the reels 30 and 38 of the draw gear 14. When the crash sensor detects that the length of the first wire 28 wound by the first reel 30 reaches a specified value, the controller activates the gas generator 16 to emit gas.

When the vehicle including the occupant protection system 10 with such a structure has a crash, the controller first activates the rotation driving units of the reels 30 and 38 of the draw gear 14, so that the reels 30 and 38 quickly wind the first wire 28 and the second wire 36, respectively. The deployable body 12 is thereby pulled by the first wire 28 to be quickly drawn downwardly from the ceiling 3. At this time, as the moving pulley 34 is pulled by the second wire 36 to move toward the rear of the vehicle, the deployable body 12 is pulled also toward the rear of the vehicle to deploy diagonally backward, as shown in FIGS. 1(b), 2(a) and 2(b). A lower rim of the deployed deployable body 12 faces the waist of the occupant seated in the rear seat 2. The deployed deployable body 12 is given a tension sufficient to receive the occupant through the first wire 28.

When the length of the first wire 28 wound by the first reel 30 reaches a specified value as the deployable body 12 is pulled by the first wire 28 to deploy downwardly, the controller activates the gas generator 16 to emit gas. Gas emitted from the gas generator 16 inflates the bags 18 and 26. As shown in FIG. 2(b), the oblong bag 26 provided along the lower rim of the deployable body 12 restrains the waist of the occupant to the rear seat 2, thereby preventing the forward movement of the occupant. When the occupant falls onto the deployable body 12, the inflated bag 18 receives the occupant like a cushion. At this time, since gas in the bag 18 flows out of the vent holes 200, impact to the occupant is absorbed.

In the occupant protection system 10, after the length of the first wire 28 wound by the first reel 30, which draws the deployable body 12 downwardly, has reached a specified value, after the deployable body 12 has deployed downwardly by a specified length or more, the gas generator 16 operates to inflate the bags 18 and 26. Therefore, even if the space between the occupant seated in the rear seat 2 and the front seat 1 ahead of the rear seat 2 is small, the deployable body 12 enters the space from above and the bags 18 and 26 are thereafter inflated to reliably receive the occupant from front.

In this embodiment, since the deployable body 12 deploys downwardly from the cabin ceiling 3, the deployable body 12 can surely deploy into a wide range ahead of the upper body of the occupant seated in the rear seat 2. In the occupant protection system 10, the bag 18 is inflated so as to protrude from the front surface of the deployable body 12 toward the occupant in the rear seat 2, and the oblong bag 26 is provided only along the lower rim of the deployable body 12. Accordingly, the volume of the bags 18 and 26 is smaller than that of an airbag that completely fills the space ahead of the occupant in the rear seat 2. As a result, the bags 18 and 26 can be inflated sufficiently early even with a relatively low-output gas generator.

Figure 3:
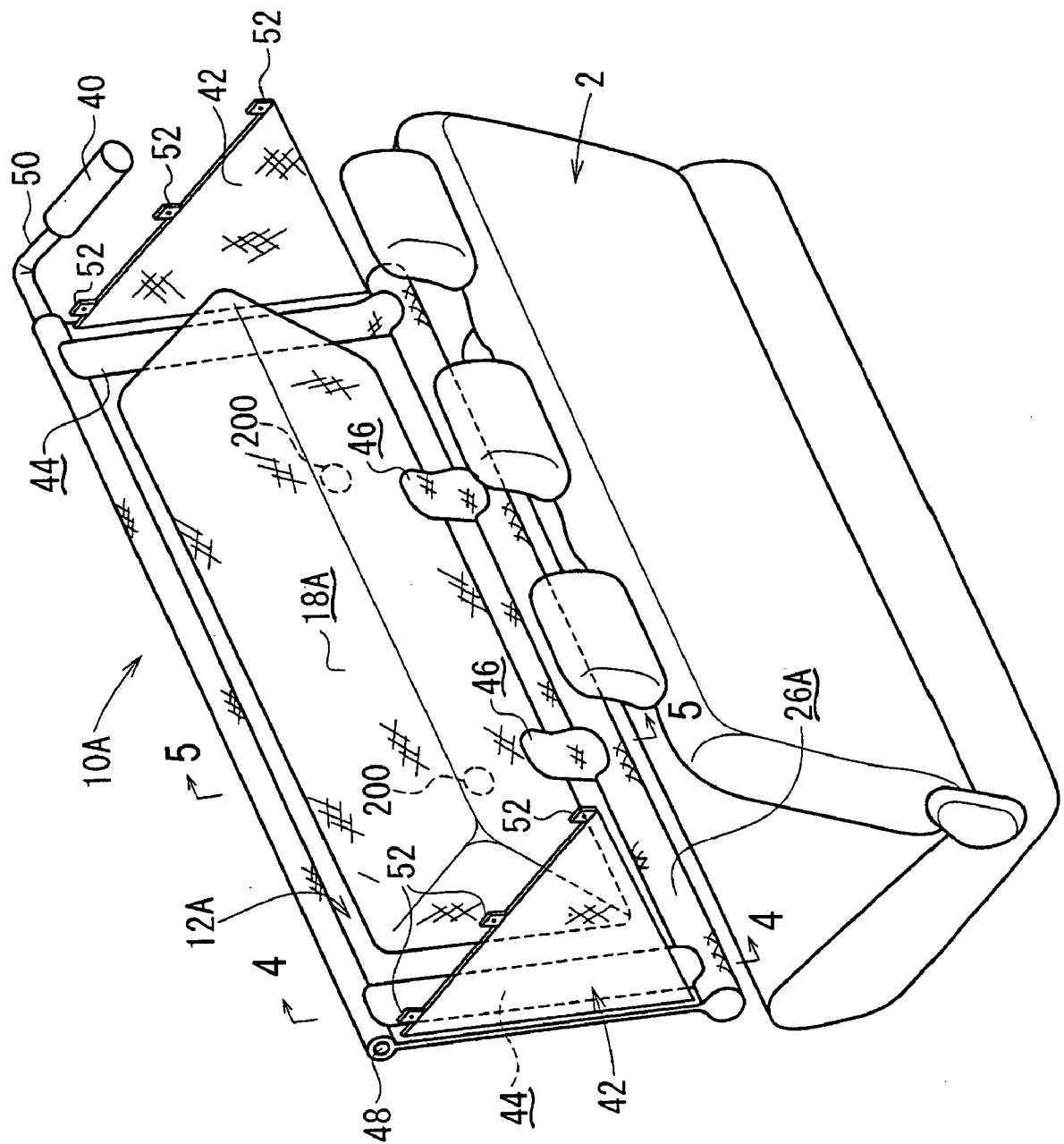
FIG. 3 is a perspective view of an occupant protection system according to another embodiment of the present invention in a state that a bag is inflated.
Figure 4:
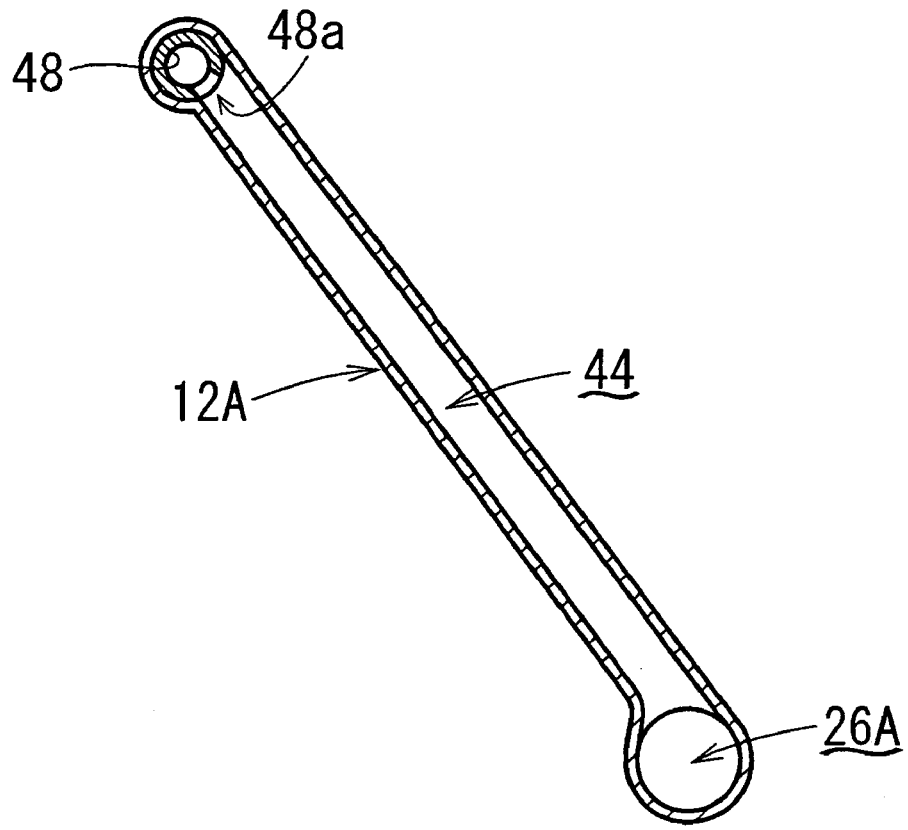
FIG. 4 is a cross-sectional view taken along line 4—4 in FIG. 3.
Figure 5:
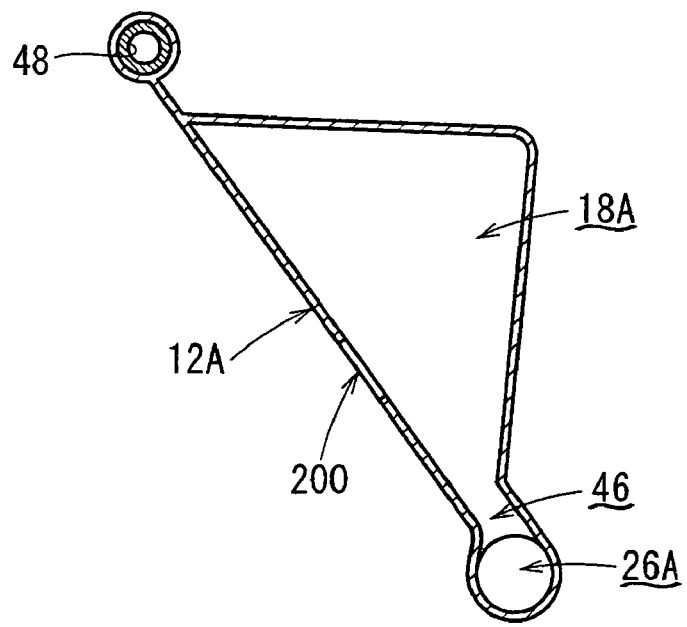
FIG. 5 is a cross-sectional view taken along line 5—5 in FIG. 3.

FIG. 3 is a perspective view of an occupant protection system 10A, with the deployable body in a deployed state, according to another embodiment of the present invention. FIG. 4 is a cross-sectional view taken along line 4—4 in FIG. 3. FIG. 5 is a cross-sectional view taken along line 5—5 in FIG. 3. In this embodiment, the occupant protection system 10A is mounted to the ceiling 3 (not shown in FIGS. 3 to 5) between the front seat 1 (not shown in FIGS. 3 to 5) and the rear seat 2.

The occupant protection system 10A includes a deployable body 12A for deploying downwardly from the ceiling 3 in vertical and lateral directions in the vehicle cabin in the region ahead of the upper body of the occupant seated in the rear seat 2; a gas generator 40; and two joints 42 connecting left and right sides of the deployable body 12A with left and right side rims of the ceiling 3 located closer to the rear of the vehicle relative to the deployable body 12A, respectively. The deployable body 12A mounts a bag 18A to be inflated with gas supplied from the gas generator 40 to receive the occupant. The bag 18A is inflated so as to protrude from the front surface of the deployable body 12A toward the occupant seated in the rear seat 2 in the region of the deployable body 12A facing the upper body of the occupant, as in the bag 18 of the embodiment shown in FIGS. 1 and 2. Also in this embodiment, the deployable body 12A is shaped like an approximately rectangular sheet with a small thickness.

In this embodiment, the rear seat 2 is for three persons. The bag 18A therefore has a lateral width capable of receiving all of the three occupants seated side by side in the rear seat 2. Although not shown, the front seat disposed ahead of the rear seat 2 includes two seats arranged laterally apart from each other. This embodiment includes two longitudinal deployable-body deploying inflatable chambers (hereinafter, referred to as longitudinal bags) 44 extending vertically along the left and right side rims of the deployable body 12A. Each longitudinal bag 44 extends from the upper rim of the deployable body 12A toward the lower rim. Also this embodiment includes an oblong bag 26A extending laterally along the lower rim of the deployable body 12A. The lower ends of the longitudinal bags 44 are connected to the opposite ends of the oblong bag 26A, respectively.

As shown in FIG. 5, between the oblong bag 26A and the bag 18A, a gas passage 46 that communicates between the oblong bag 26A and the lower part of the bag 18A extends vertically along the front surface of the deployable body 12A. The gas passages 46 are provided in two positions facing a space between the central occupant and the left and right occupants of the three occupants seated side by side in the rear seat 2.

As shown in FIGS. 4 and 5, the deployable body 12A includes a tubular duct (pipe) 48 passing through the upper rim. The duct 48 is fixed along the ceiling 3 and extends in the direction of the vehicle width (laterally). The gas generator 40 is joined with one end of the duct 48 through a duct 50. The duct 50 and the gas generator 40 are fixed along the side rim of the ceiling 3. As shown in FIG. 4, the duct 48 has vent holes 48a each communicating with the upper end of each longitudinal bag 44.

When the gas generator 40 operates to emit gas, gas from the gas generator 40 is first introduced into the duct 48 and then introduced into the left and right longitudinal bags 44. Gas flows from the upper end of the longitudinal bag 44 toward the lower end and into the oblong bag 26A communicating with the respective lower ends of the longitudinal bags 44. Gas in the oblong bag 26A thereafter flows into the bag 18A through the gas passages 46. The embodiment has the vent holes 200 for discharging gas in the inflated bag 18A to the exterior.

As shown in FIG. 3, the vent holes 200 are disposed in the lower center of each of the left and right half of the deployable body 12, which is opposite to the surface of the bag 18 facing the rear-seat occupant when the deployable body 12A fully deploys, in other words, in the position facing the lower center of the back of the backrest of each seat of the front seat 1. Accordingly, the vent holes are not closed by the backrest or the headrest of the front seat, or the body of the occupant in the rear seat 2 who falls onto the bag 18A, and gas flowing out of the vent holes 200 does not blow not only onto the occupant in the rear seat 2 but also onto the occupant in the front seat 1.

The joints 42 are each shaped like an approximately triangular sheet with three sides, a side (first side) extending along the left or right side of the deployable body 12A, a side (second side) along the left or right side rim of the ceiling 3, and a side (third side) connecting ends of the first and second sides with each other. The first side of each joint 42 extending along the side of the deployable body 12A is joined with the side of the deployable body 12A with joint means such as stitching or by integration of the deployable body 12A and the joint 42. A plurality of projections 52 projects from the second side of the joint 42 extending along the side rim of the ceiling 3 for joining the second side with the side rim of the ceiling 3. Each projection 52 has an insertion hole (reference numeral omitted) for a bolt etc., through which a bolt etc. passes to fasten the projection 52 to the side rim of the ceiling 3.

An angle formed by the first side extending along the side of the deployable body 12A and the second side extending along the side rim of the ceiling 3 is an acute angle. The acute angle is preferably within a range from 45 to 80 degrees. A length of the third side connecting the ends of the first side and the second side is approximately equal to that of the second side extending along the side rim of the ceiling 3, and the third side may be longer than the second side.

The deployable body 12A in a non-deployed state is folded from the lower end toward the upper end into a long and thin folded body extending along the ceiling 3 and covered with a deployable-body cover (not shown) mounted to the ceiling 3. The deployable-body cover has a torn-open portion which is torn open to allow the downward deployment of the deployable body 12A when the deployable body 12A deploys. The joints 42 are folded in a long and thin shape extending along the left and right side rims of the ceiling 3. The side rims of the ceiling 3 each mounts a joint cover (not shown) for covering the folded joints 42. Also the joint cover has a torn-open portion which is torn open to allow the downward deployment of the joint 42 when the joint 42 deploys following the deployment of the deployable body 12A. The deployable-body cover and the joint cover may be integrated to one or separated.

In this embodiment, since the third side and the second side of the joint 42 are approximately equal in length as described above, the deployable body 12A can be folded with little deviation from the upper rim to the lower rim along the length of the vehicle when the deployable body 12A is folded. Accordingly, the deployable body 12A can be folded along the length of the vehicle into a relatively compact size. When the third side of the joint 42 is longer than the first side, the deviation along the length of the vehicle can be absorbed when the deployable body 12A folded from the upper rim to the lower rim.

In the occupant protection system 10A constructed as described above, when a crash sensor (not shown) detects a car crash, the gas generator 40 immediately operates to emit gas. As described above, gas from the gas generator 40 is first introduced into the longitudinal bags 44 through the duct 48. Gas flows from the upper end toward the lower end in the longitudinal bags 44, and the deployable body 12A deploys downwardly from the ceiling 3 to expand toward the front of the rear seat 2. With the deployment of the deployable body 12A, the left and right joints 42 also deploy from the ceiling 3 downwardly.

Since the angle formed by the first side and the second side of the joint 42 is an acute angle, as described above, the deployable body 12A extends diagonally and downwardly toward the rear of the vehicle along the first side of the joint 42, so that the oblong bag 26A provided along the lower rim of the deployable body 12A faces the waist of the rear-seat occupant. The oblong bag 26A is inflated by gas emitted from the gas generator 40 through the longitudinal bags 44 to restrain the waist of the occupant to the rear seat 2, thereby preventing the forward movement of the occupant. Gas in the oblong bag 26A flows into the bag 18A through the gas passages 46, so that the bag 18A is inflated to project from the front surface of the deployable body 12A toward the occupant seated in the rear seat 2, thereby receiving the occupant.

The left and right sides of the deployable body 12A are joined to the left and right side rims of the ceiling 3 extending closer to the rear of the vehicle relative to the deployable body 12A, respectively, through the joints 42. Accordingly, even if the occupant in the rear seat 2 falls onto the inflated bag 18A, the deployable body 12A does not retract toward the front of the vehicle, thereby reliably receiving the occupant with the bag 18A. At this time, gas in the bag 18A flows out through the vent holes 200 to sufficiently relieve the impact on the occupant.

In the occupant protection system 10A, gas emitted from the gas generator 40 is first introduced into the two longitudinal bags 44, and then into the bag 18A through the longitudinal bags 44 and the oblong bag 26A. The bag 18A therefore starts inflation after the deployable body 12A fully deploys downwardly from the ceiling 3 with the inflation of the longitudinal bags 44. Accordingly, even if the space between the occupant seated in the rear seat 2 and the front seat 1 ahead of the rear seat 2 is small, the deployable body 12A enters the space from above and the bag 18A is inflated to reliably receive the occupant from front.

In this embodiment, the two longitudinal bags 44 are inflated with gas emitted from the gas generator 40, so that the deployable body 12A deploys downwardly from the ceiling 3, thereby making the deployment mechanism of the deployable body 12A simple. Also, since gas from the gas generator 40 is introduced to the bag 18A through the longitudinal bags 44 and the oblong bag 26A, the bag 18A and the longitudinal bags 44 can be inflated with the common gas generator 40.

FIG. 6 is a perspective view of an occupant protection system 10B, with a bag in a non-inflated state, according to a further embodiment of the present invention. FIG. 7 is a perspective view of a bag 18B of the occupant protection system 10B in an inflated state.

As in the occupant protection system 10A shown in FIGS. 3 to 5, the occupant protection system 10B includes a deployable body 12B for deploying downwardly from the ceiling 3 (not shown in FIGS. 6 and 7) in vertical and lateral directions in the vehicle cabin in the region ahead of the upper body of the occupant seated in the rear seat 2 (not shown in FIGS. 6 and 7); the gas generator 40; and the two joints 42 connecting the left and right sides of the deployable body 12B with the left and right side rims of the ceiling 3 closer to the rear of the vehicle relative to the deployable body 12B, respectively. The deployable body 12B mounts a bag 18B to be inflated with gas supplied from the gas generator 40 to receive the occupant. The bag 18B is inflated so as to protrude from the front surface of the deployable body 12B toward the occupant seated in the rear seat 2 in the region of the deployable body 12B facing the upper body of the occupant. In this embodiment, the deployable body 12B is shaped like an approximately rectangular sheet with a small thickness.

The deployable body 12B also includes the two longitudinal bags 44 serving as deployable-body deploying inflatable chambers extending vertically along the left and right side rims of the deployable body 12B and an oblong bag 26B extending laterally along the lower rim of the deployable body 12B. The lower ends of the longitudinal bags 44 are connected to the opposite ends of the oblong bag 26B. The deployable body 12B includes the tubular duct 48 passing through the upper rim. The gas generator 40 is joined with one end of the duct 48 through the duct 50. The duct 48 has vent holes (not shown) each communicating with the upper end of each longitudinal bag 44. The duct 48 is fixed along the ceiling 3 and extends in the direction of the vehicle width.

Gas passages 60 extend between the duct 48 and the bag 18B for introducing gas emitted from the gas generator 40 into the duct 48 and the upper part of the bag 18B. The gas passages 60 are apart from each other along a length of the duct 48. The duct 48 has vent holes (not shown) communicating with the gas passages 60.

In the occupant protection system 10B, as shown in FIG. 6, when the gas generator 40 does not emit gas, the bag 18B is folded such that a surface 62 opposed to the occupant overlaps the front surface of the deployable body 12B, in a so-called flat state. The occupant-opposing surface 62 is pushed against the front surface of the deployable body 12B with straps 64 serving as inflation-thickness limitation means for the bag 18B. The straps 64 are routed laterally along the front surface of the occupant-opposing surface 62 of the bag 18 folded into a flat state, opposite ends of which are fixed to the front surface of the deployable body 12B. The intermediate portions of the straps 64 are fixed to the front surface of the occupant-opposing surface 62. Reference numeral 64a denotes a seam that fixes the end of the strap 64 to the front surface of the deployable body 12B. Reference numeral 64b denotes a seam that fixes the intermediate portion of the strap 64 to the front surface of the occupant-opposing surface 62.

Notches 66 are disposed at the vicinities of the opposite ends of the straps 64 (the intermediate portion of the adjacent seams 64a and 64b) for cutting the straps 64 when a specified longitudinal tension or more is applied to the straps 64. When gas from the gas generator 40 is introduced into the bag 18B and the gas pressure in the bag 18B exceeds a specified level, the straps 64 are cut at the notches 66 to allow the expansion of the occupant-opposing surface 62 toward the occupant. This embodiment has two straps 64 at vertically different positions.

Although not shown, also in this embodiment, the vent holes 200 for discharging gas in the inflated bag 18B to the exterior are disposed in positions where they are not closed by the backrest or the headrest of the front seat or the body of the rear-seat occupant who falls onto the bag 18B, and gas flowing out of the vent holes 200 is not blown not only onto the rear-seat occupant but also onto the front-seat occupant. The other structure of the occupant protection system 10B is similar to that of the occupant protection system 10A shown in FIGS. 3 to 5. Reference numerals in FIGS. 6 and 7 same as those in FIGS. 3 to 5 indicate the same components.

In the occupant protection system 10B constructed above, when a crash sensor (not shown) detects a car crash, the gas generator 40 immediately operates to emit gas, as in the occupant protection system 10A. Gas emitted from the gas generator 40 is introduced into the longitudinal bags 44 through the duct 48. As in the deployable body 12A of the occupant protection system 10A, the longitudinal bags 44 are inflated from the upper end toward the lower end and the deployable body 12B is inflated from the ceiling 3 downwardly to expand toward the front of the rear seat 2. With the deployment of the deployable body 12B, the left and right joints 42 also deploy downwardly from the ceiling 3. The deployed deployable body 12B is drawn to the part of the joints 42 adjacent to the rear of the vehicle to extend diagonally and downwardly toward the rear of the vehicle. Accordingly, the oblong bag 26B disposed along the lower rim of the deployable body 12B faces the waist of the rear-seat occupant. The oblong bag 26B is inflated with gas flowing through the longitudinal bags 44 to restrain the waist of the occupant, thereby preventing the forward movement of the occupant.

When gas from the gas generator 40 is introduced into the duct 48, a part of gas flows also into the bag 18B through the gas passages 60. The occupant-opposing surface 62 of the bag 18B is, however, restrained to the front surface of the deployable body 12B with the straps 64 to be limited in an inflation thickness until the inner gas pressure reaches a predetermined level. Accordingly, even if the space between the occupant seated in the rear seat 2 and the front seat 1 ahead of the rear seat 2 (not shown in FIGS. 6 and 7) is narrow, the deployable body 12B can surely enter the space from above. When the longitudinal bags 44 are inflated sufficiently and the gas pressure in the bag 18B exceeds a specified level, the straps 64 are cut to relieve the limitation of the bag 18B, so that the bag 18B is inflated to protrude toward the occupant, thereby receiving the occupant.

In this embodiment, the left and right sides of the deployable body 12B are joined with the left and right side rims of the ceiling 3 extending closer to the rear of the vehicle relative to the deployable body 12B, respectively, with the joints 42. Accordingly, even if the occupant in the rear seat 2 falls onto the inflated bag 18B, the deployable body 12B does not retract toward the front of the vehicle, thereby receiving the occupant reliably with the bag 18B. At this time, gas in the inflated bag 18B flows out through vent holes (not shown), thereby sufficiently absorbing the impact on the occupant.

Figure 8A:
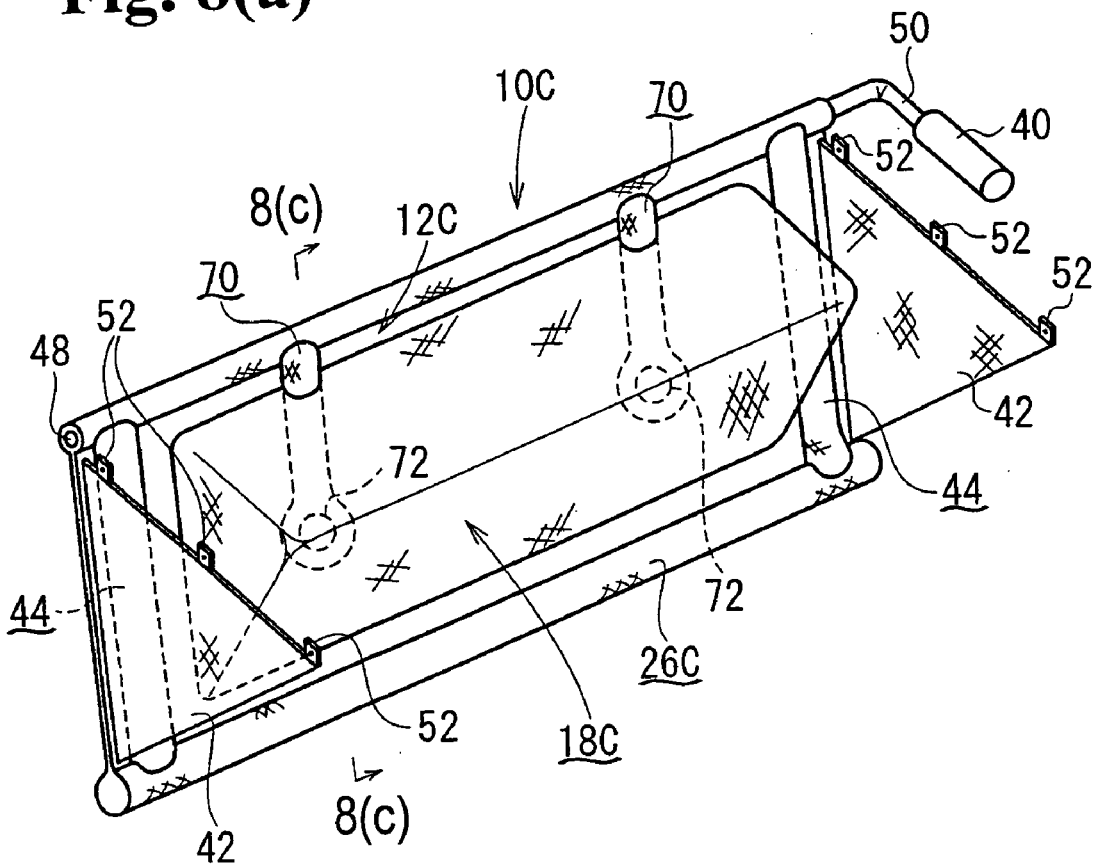
FIGS. 8(a) to 8(c) are views showing a structure of an occupant protection system according to a still further embodiment of the present invention.
Figure 8B:
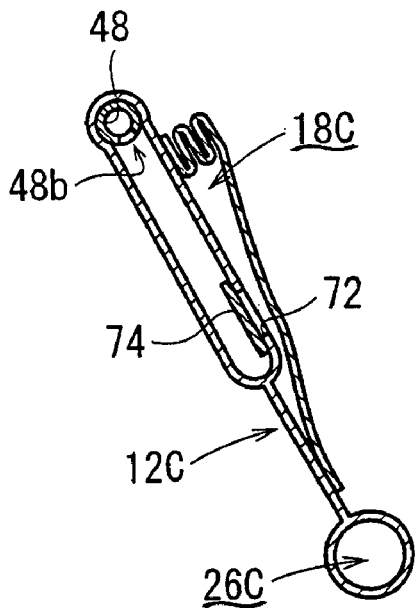
Figure 8C:
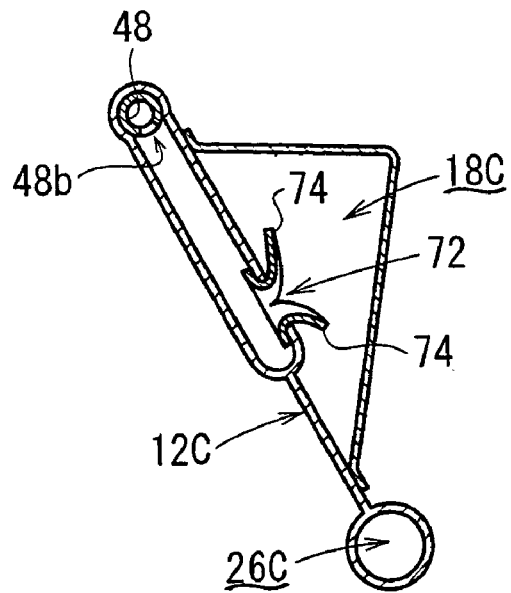

In the embodiment shown in FIGS. 6 and 7, an increase in a deployment thickness of the bag 18B is limited with the deployment-thickness limitation means (straps 64) until the deployable body 12B sufficiently deploys toward the front of the occupant in the rear seat 2. The inflation of the bag may be limited with valve means for checking the flow of gas into the bag until an inflatable body 12C is inflated sufficiently, as in an occupant protection system 10C shown in FIG. 8(a). FIG. 8(a) is a perspective view of an occupant protection system 10C with such a structure, with the bag in an inflated state. FIG. 8(b) is a cross-sectional view of the identical part to that in FIG. 8(c) with the bag in a non-inflated state. FIG. 8(c) is a cross-sectional view taken along line 8(c)—8(c) in FIG. 8(a).

As in the occupant protection system 10B shown in FIGS. 6 and 7, the occupant protection system 10C also includes a deployable body 12C for deploying downwardly from the ceiling 3 in vertical and lateral directions in the vehicle cabin in the region ahead of the upper body of an occupant seated in the rear seat 2 (not shown in FIGS. 8(a) to 8(c)); the gas generator 40; and the two joints 42 connecting the left and right sides of the deployable body 12C with the left and right sides of the ceiling 3 closer to the rear of the vehicle relative to the deployable body 12C, respectively. The deployable body 12C mounts a bag 18C to be inflated with gas supplied from the gas generator 40 to receive the occupant. Also the bag 18C is inflated so as to protrude from the front surface of the deployable body 12C toward the occupant seated in the rear seat 2 in the region of the deployable body 12C facing the upper body of the occupant. Also in this embodiment, the deployable body 12C is shaped like an approximately rectangular sheet with a small thickness.

The deployable body 12C includes the two longitudinal bags 44 serving as longitudinal deployable-body deploying inflatable chambers extending vertically along the left and right side rims of the deployable body 12C, and an oblong bag 26C extending laterally along the lower rim of the deployable body 12C. The lower ends of the longitudinal bags 44 are connected to the opposite ends of the oblong bag 26C. The deployable body 12C includes the tubular duct 48 passing through the upper rim. The gas generator 40 is joined with one end of the duct 48 through the duct 50. The duct 48 has vent holes (not shown) each communicating with the upper end of each longitudinal bag 44. The duct 48 is fixed along the cabin ceiling 3 and extends in the direction of the vehicle width.

A gas passage 70 is provided between the duct 48 and the upper part of the bag 18C for introducing gas emitted from the gas generator 40 into the duct 48 and the bag 18C. The duct 48 has a vent hole 48b communicating with the gas passage 70. In this embodiment, the gas passage 70 extends vertically from the duct 48 to the height that is the vertical intermediate point of the bag 18C. A gas supply port 72 is provided at the lower end of the gas passage 70 for supplying gas into the bag 18C. This embodiment has two gas passages 70 apart from each other along the length of the duct 48.

The gas supply port 72 is closed with a closing film 74 serving as valve means, as shown in FIG. 8(b). The closing film 74 is ruptured to open the gas supply port 72, as shown in FIG. 8(c), when the gas pressure of an upstream part from the gas supply port 72 (in the duct 48, the longitudinal bags 44, the oblong bag 26C, and the gas passages 70) exceeds a specified level.

Although not shown, also in this embodiment, the vent holes 200 for discharging gas in the inflated bag 18C to the exterior are disposed in positions where they are not closed by the backrest or the headrest of the front seat 1 or the body of the occupant in the rear seat 2 who falls onto the bag 18C, and gas flowing out from the vent holes 200 is not blown not only onto the rear-seat occupant but also onto the front-seat occupant. The other structure of the occupant protection system 10C is similar to that of the occupant protection system 10A shown in FIGS. 3 to 5.

In the occupant protection system 10C as constructed above, when a crash sensor (not shown) detects a car crash, the gas generator 40 immediately operates to emit gas, as in the occupant protection system 10A. Gas emitted from the gas generator 40 is introduced into the longitudinal bags 44 through the duct 48. The longitudinal bags 44 are inflated from the upper end toward the lower end and the deployable body 12C deploys downwardly from the ceiling 3. At this time, a part of gas emitted from the gas generator 40 into the duct 48 is introduced also into the gas passages 70. The gas supply ports 72 communicating from the gas passages 70 into the bag 18C, however, are each closed with the closing film 74. Accordingly, the bag 18C is not supplied with gas, not inflating until the longitudinal bags 44 and the oblong bag 26C are inflated sufficiently to bring the gas pressure upstream from the gas supply port 72 to a specified level, thereby rupturing the closing film 74, when the deployable body 12C fully deploys. Accordingly, also in the occupant protection system 10C, even if the space between the occupant seated in the rear seat 2 and the front seat 1 ahead of the rear seat 2 (not shown in FIGS. 8(a) to 8(c)) is narrow, the deployable body 12C can surely enter the space from above.

Subsequently, when the longitudinal bags 44 and the oblong bag 26C are inflated sufficiently and the gas pressure upstream from the gas supply port 72 has exceeded a specified level, the closing film 74 is ruptured to open the gas supply port 72, so that gas flows into the bag 18C through the gas supply port 72. The bag 18C is inflated to protrude toward the occupant, thereby receiving the occupant. At this time, gas in the bag 18C flows out from vent holes (not shown) to absorb the impact on the occupant.

Figure 9A:
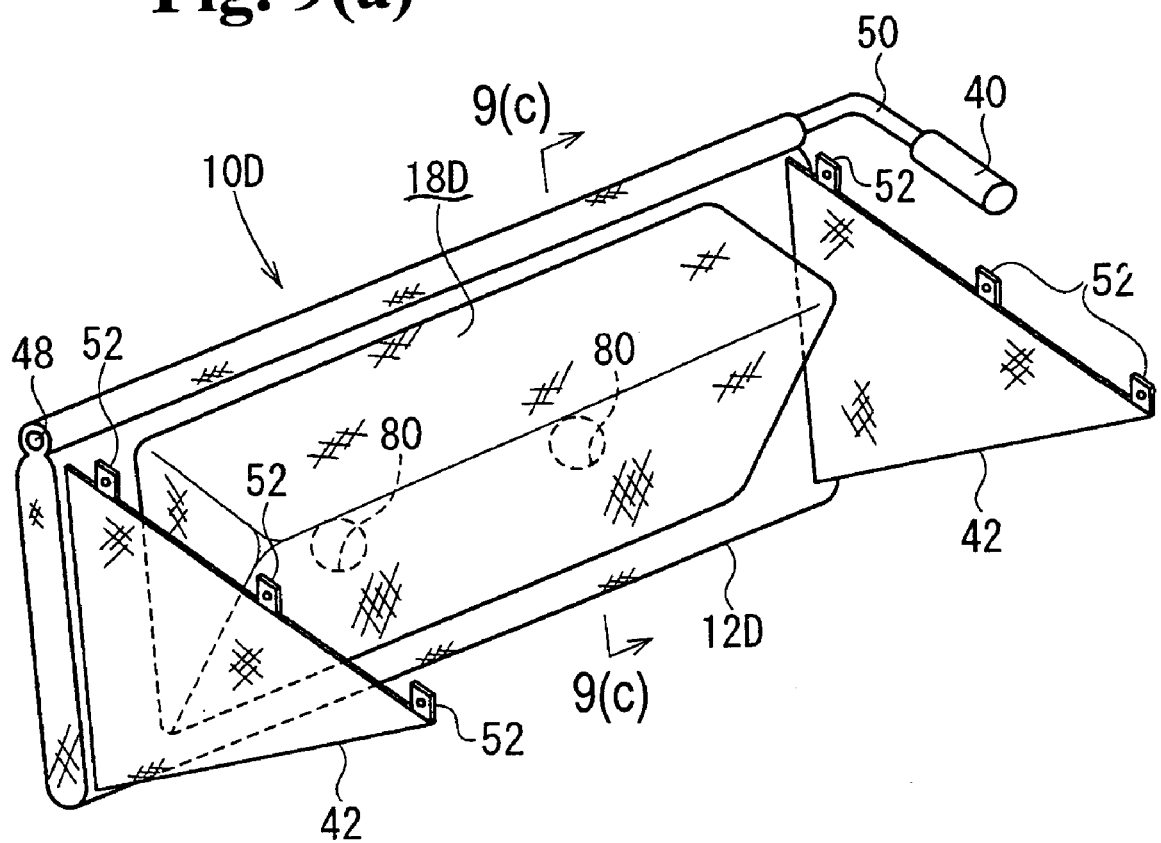
FIGS. 9(a) to 9(c) are views showing a structure of an occupant protection system according to a still further embodiment of the present invention.
Figure 9B:
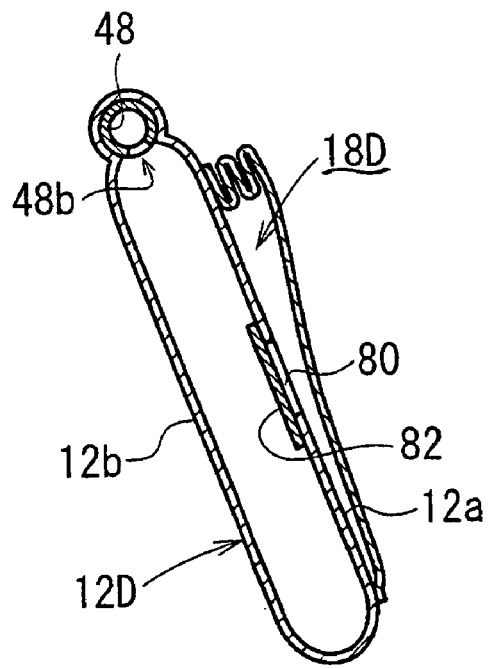
Figure 9C:
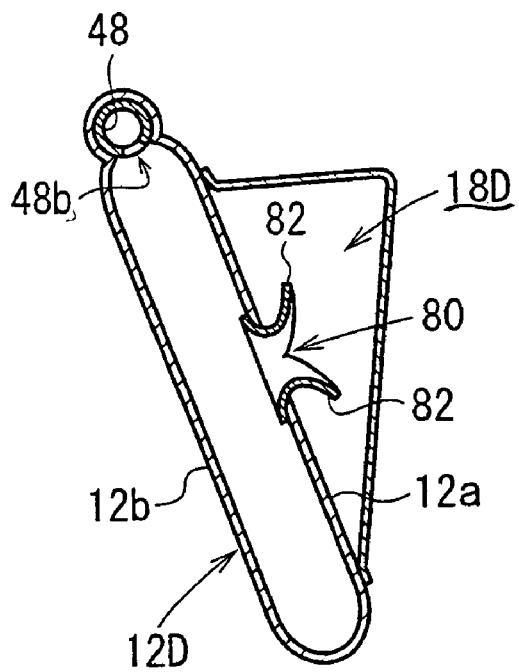

Although the deployable bodies of the foregoing embodiments are shaped like a sheet with a small thickness, the deployable body may be inflatable so as to increase in a thickness, as in an occupant protection system 10D shown in FIGS. 9(a) to 9(c). FIG. 9(a) is a perspective view of the occupant protection system 10D with such a structure, with the bag in an inflated state. FIG. 9(b) is a cross-sectional view of the identical part to that shown in FIG. 9(c), with the bag in a non-inflated state. FIG. 9(c) is a cross-sectional view taken along line 9(c)—9(c) in FIG. 9(a).

In the occupant protection system 10D shown in FIGS. 9(a) to 9(c), the deployable body 12D includes a front panel 12a facing the occupant seated in the rear seat 2 (not shown in FIGS. 9(a) to 9(c)) and a rear panel 12b opposite to the front panel 12a, the outer peripheries of which are connected to each other into a flat bag form. The deployable body 12D can be inflated with gas supplied to the interior thereof. Although not shown, the deployable body 12D is limited in a thickness with deployment-thickness limitation means to prevent an excess increase in a thickness during the deployment. Examples of the deployment-thickness limitation means include a structure in which the front panel 12a and the rear panel 12b are joined together with a strap in the deployable body 12D and another structure in which the front panel 12a and the rear panel 12b are directly joined together by stitching.

The deployable body 12D of the occupant protection system 10D can deploy downwardly from the ceiling 3 (not shown in FIGS. 9(a) to 9(c)) in vertical and lateral directions in the vehicle cabin in the region ahead of the upper body of an occupant seated in the rear seat 2. The occupant protection system 10D includes the deployable body 12D, the gas generator 40, and the two joints 42 connecting the left and right sides of the deployable body 12D with the left and right sides of the ceiling 3 closer to the rear of the vehicle relative to the deployable body 12D, respectively. The deployable body 12D of this embodiment mounts a bag 18D to be inflated so as to protrude from the front panel 12a toward the occupant seated in the rear seat 2 by the introduction of gas.

The deployable body 12D of this embodiment also includes the tubular duct 48 passing through the upper rim. The gas generator 40 is joined with one end of the duct 48 through the duct 50. The duct 48 has the vent holes 48c communicating with the inner space of the deployable body 12D. The duct 48 of this embodiment is also fixed along the cabin ceiling 3 and extends in the direction of the vehicle width.

The front panel 12a of the deployable body 12D has gas supply ports 80 for communicating the deployable body 12D and the bag 18D with each other. Each gas supply port 80 is closed with a closing film 82 serving as valve means, as shown in FIG. 9(b). The closing film 74 is ruptured when the gas pressure in the deployable body 12D exceeds a specified level to open the gas supply port 80, as shown in FIG. 9(c). The other structure of the occupant protection system 10D is similar to that of the occupant protection system 10A shown in FIGS. 3 to 5.

In the occupant protection system 10D as constructed above, when a crash sensor (not shown) detects a car crash, the gas generator 40 immediately operates to emit gas, as in the occupant protection system 10A. Gas emitted from the gas generator 40 is introduced into the deployable body 12D through the duct 48. The deployable body 12D is inflated downwardly from the ceiling 3 with gas emitted from the gas generator 40. At this time, each gas supply port 80 communicating from the deployable body 12D into the bag 18D is closed with the closing film 82. Accordingly, the bag 18D is not supplied with gas and not inflated until the deployable body 12D is inflated sufficiently to bring the gas pressure in the deployable body 12D to a specified level, thereby rupturing the closing films 82, i.e. until the deployable body 12D is inflated sufficiently. Accordingly, also in the occupant protection system 10D, even if the space between the occupant seated in the rear seat 2 and the front seat 1 ahead of the rear seat 2 (not shown in FIGS. 9(a) to 9(c)) is narrow, the deployable body 12D can surely enter the space from above.

Subsequently, when the deployable body 12D is inflated sufficiently and the gas pressure in the deployable body 12D has exceeded a specified level, the closing films 82 are ruptured to open the gas supply ports 80, so that gas flows into the bag 18D through the gas supply ports 80. The bag 18D is inflated to protrude toward the occupant, thereby receiving the occupant. Since the deployable body 12D of the occupant protection system 10D is also inflated, the reaction force during reception of the occupant is further reduced.

Figure 10:
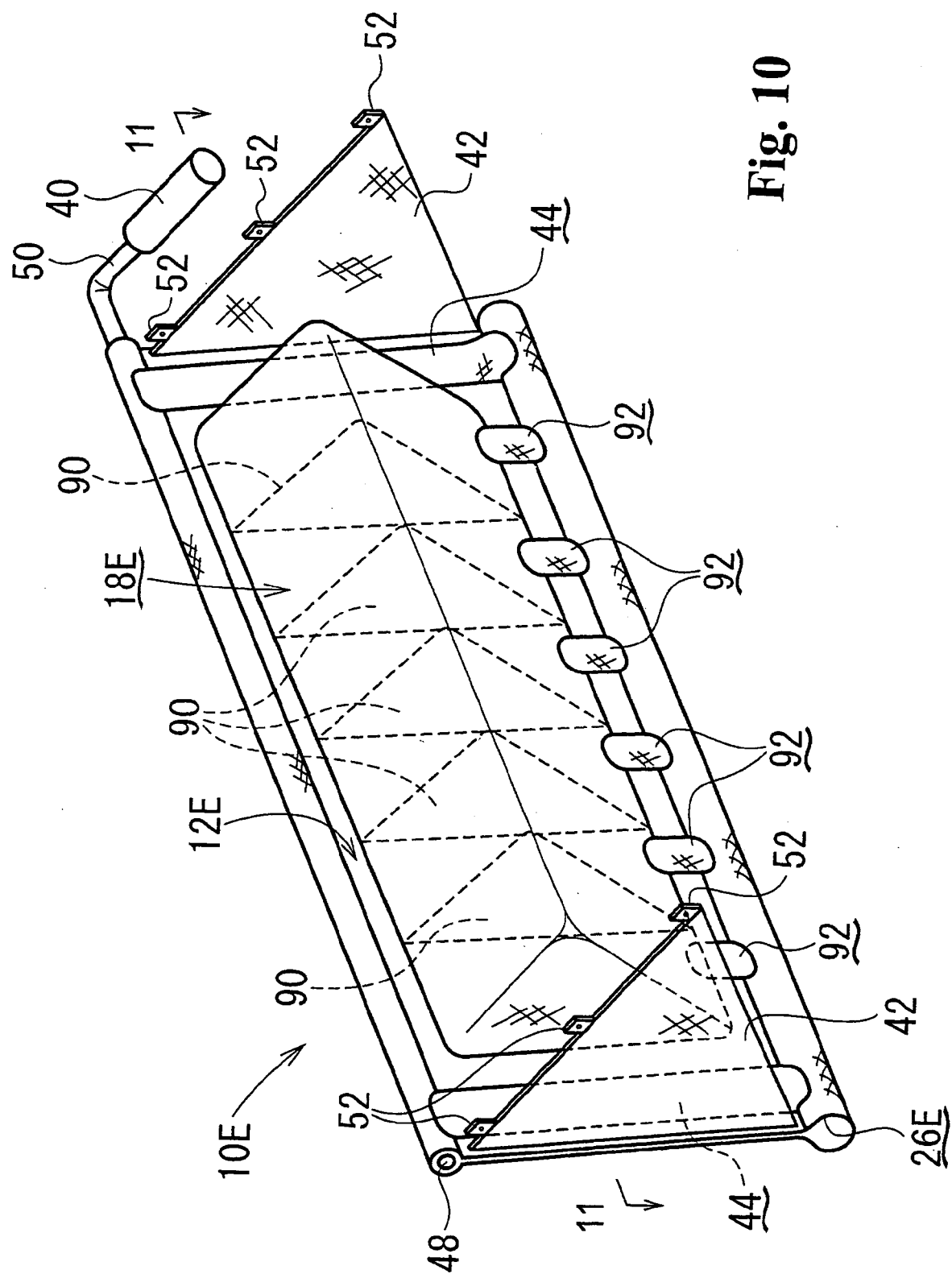
FIG. 10 is a perspective view of an occupant protection system according to a still further embodiment of the present invention in a state that a bag is inflated.
Figure 11:
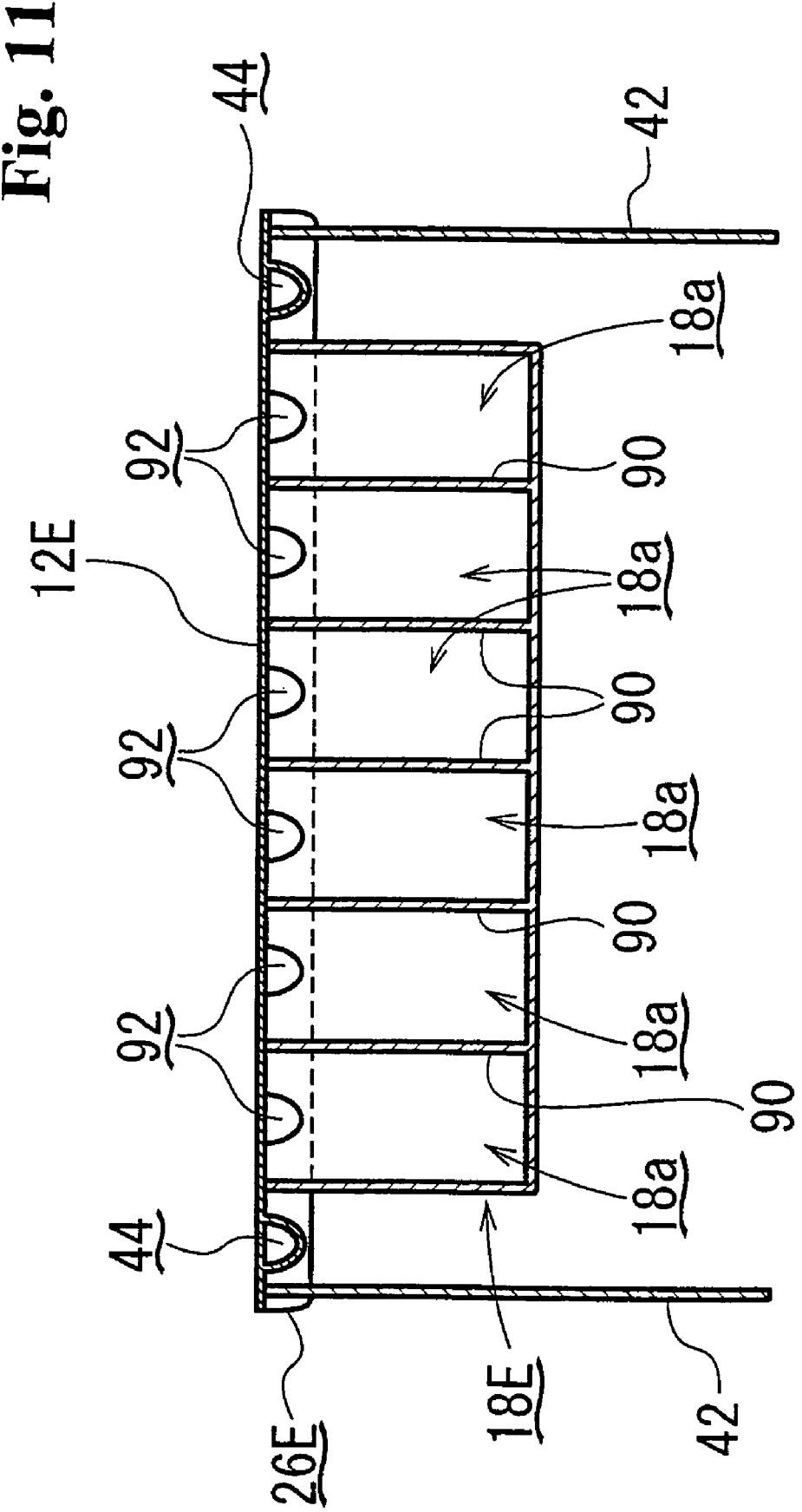
FIG. 11 is a cross-sectional view taken along line 11—11 in FIG. 10.

In the invention, the inner space of the bag for receiving the occupant may be divided into multiple chambers as shown in an occupant protection system 10E shown in FIGS. 10 and 11. FIG. 10 is a perspective view of the occupant protection system 10E with such a structure, with the bag in an inflated state. FIG. 11 is a cross-sectional view taken along line 11—11 in FIG. 10.

As in the occupant protection system 10A shown in FIGS. 3 to 5, the occupant protection system 10E includes a deployable body 12E for deploying downwardly from the ceiling 3 in vertical and lateral directions in the vehicle cabin in the region ahead of the upper body of the occupant seated in the rear seat 2 (not shown in FIGS. 10 and 11); the gas generator 40; and the two joints 42 connecting the left and right sides of the deployable body 12E with the left and right sides of the ceiling 3 closer to the rear of the vehicle relative to the deployable body 12E, respectively. The deployable body 12E mounts a bag 18E to be inflated with gas supplied from the gas generator 40 to receive the occupant. The bag 18E is inflated so as to protrude from the front surface of the deployable body 12E toward the occupant seated in the rear seat 2 in the region of the deployable body 12E which, faces the upper body of the occupant. In this embodiment, the deployable body 12E is shaped like an approximately rectangular sheet with a small thickness.

Also the deployable body 12E includes the two longitudinal bags 44 serving as deployable-body deploying inflatable chambers extending vertically along the left and right side rims of the deployable body 12E, and an oblong bag 26E extending laterally along the lower rim of the deployable body 12E. The lower ends of the longitudinal bags 44 are connected to the opposite ends of the oblong bag 26E. The deployable body 12E includes the tubular duct 48 passing through the upper rim. The gas generator 40 is joined with one end of the duct 48 through the duct 50. The duct 48 has vent holes (not shown) each communicating with the upper end of each longitudinal bag 44. The duct 48 is fixed along the cabin ceiling 3 and extends in the direction of the vehicle width.

In this embodiment, the inner space of the bag 18E is divided into a plurality (six in this embodiment) of small chambers 18a arranged along the vehicle width. Reference numeral 90 denotes a partition panel that partitions the adjacent small chambers 18a. Gas passages 92 that communicate the oblong bag 26E with the small chambers 18a extend vertically along the front surface of the deployable body 12E between the lower part of the bag 18E and the oblong bag 26E. The other structure of the occupant protection system 10E is similar to that of the occupant protection system 10A shown in FIGS. 3 to 5.

In the occupant protection system 10E as constructed above, when a crash sensor (not shown) detects a car crash, the gas generator 40 immediately operates to emit gas, as in the occupant protection system 10A. Gas emitted from the gas generator 40 is first introduced into the longitudinal bags 44 through the duct 48 and circulates from the upper end toward the lower end in the longitudinal bags 44, and the deployable body 12E deploys downwardly from the ceiling 3 in the front of the rear seat 2.

Subsequently, gas in the longitudinal bags 44 flows into the oblong bag 26E to inflate it, and gas in the oblong bag 26E flows into the small chambers 18a of the bag 18E through the gas passages 92. Accordingly, the bag 18E is inflated so as to protrude from the front surface of the deployable body 12E toward the occupant seated in the rear seat 2, thereby receiving the occupant.

Accordingly, also in the occupant protection system 10E, gas emitted from the gas generator 40 is first introduced into the longitudinal bags 44 and passes through the longitudinal bags 44 and the oblong bag 26E into the small chambers 18a of the bag 18E, as in the occupant protection system 10A. The bag 18E therefore starts inflation after the deployable body 12E deploys downwardly from the ceiling 3 with the expansion of the longitudinal bags 44. Accordingly, even if the space between the occupant seated in the rear seat 2 and the front seat 1 ahead of the rear seat 2 is small, the deployable body 12E can enter the space from above and the bag 18E is inflated to reliably receive the occupant from front.

In the occupant protection system 10E, since the interior of the bag 18E is divided into the multiple small chambers 18a, even if the occupant falls partially onto the bag 18E, gas in the bag 18E is prevented from flowing out to a portion onto which no occupant falls, so that the bag 18E can firmly receive the occupant. Although not shown, the invention may have vent holes in the partition panels 90 for communicating the adjacent small chambers 18a with each other, thereby preventing an excess increase in inner pressure only in the small chambers 18a to which the occupant falls.

Figure 12:
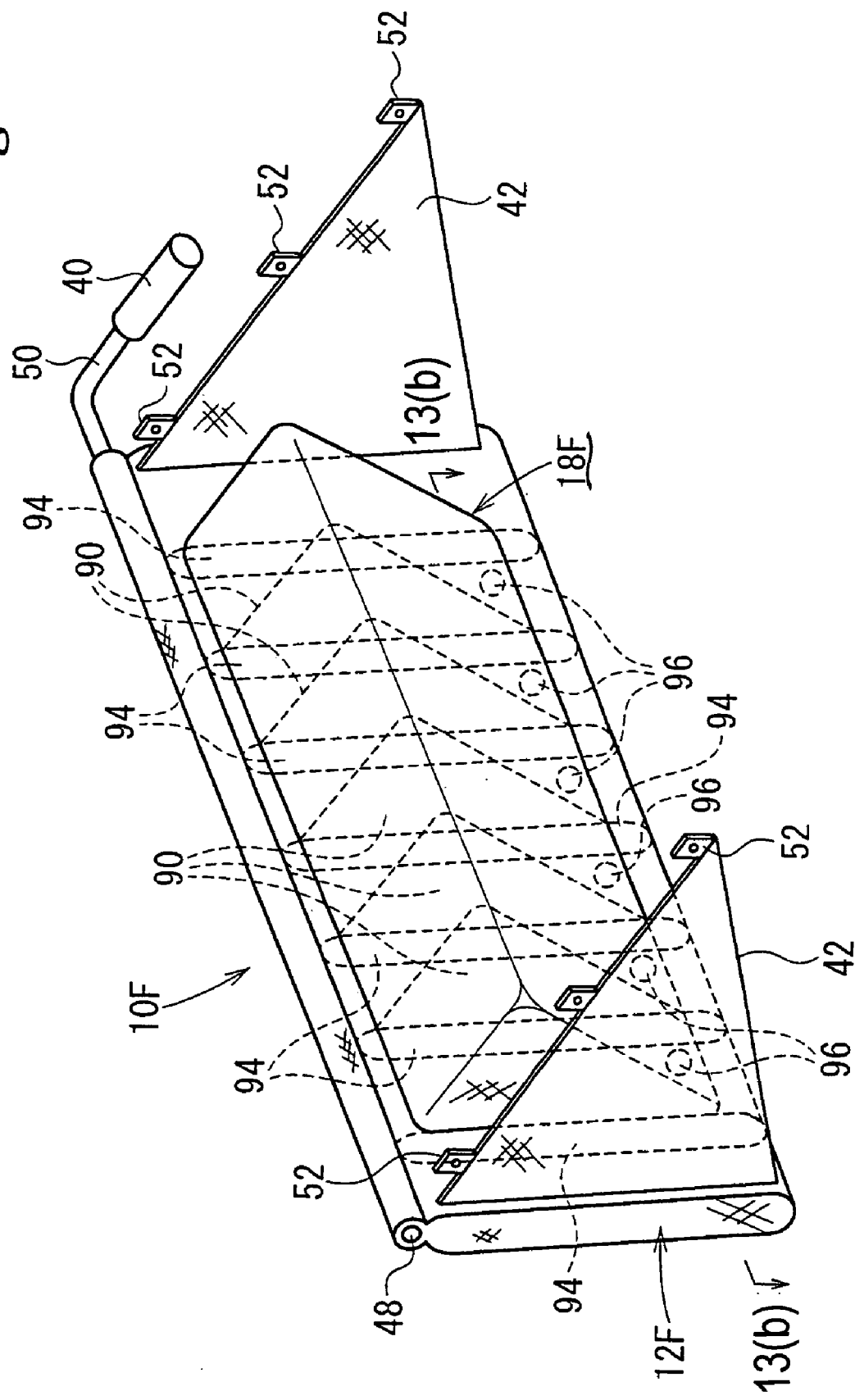
FIG. 12 is a perspective view of an occupant protection system according to a still further embodiment of the present invention in a state that a bag is inflated.
Figure 13A:
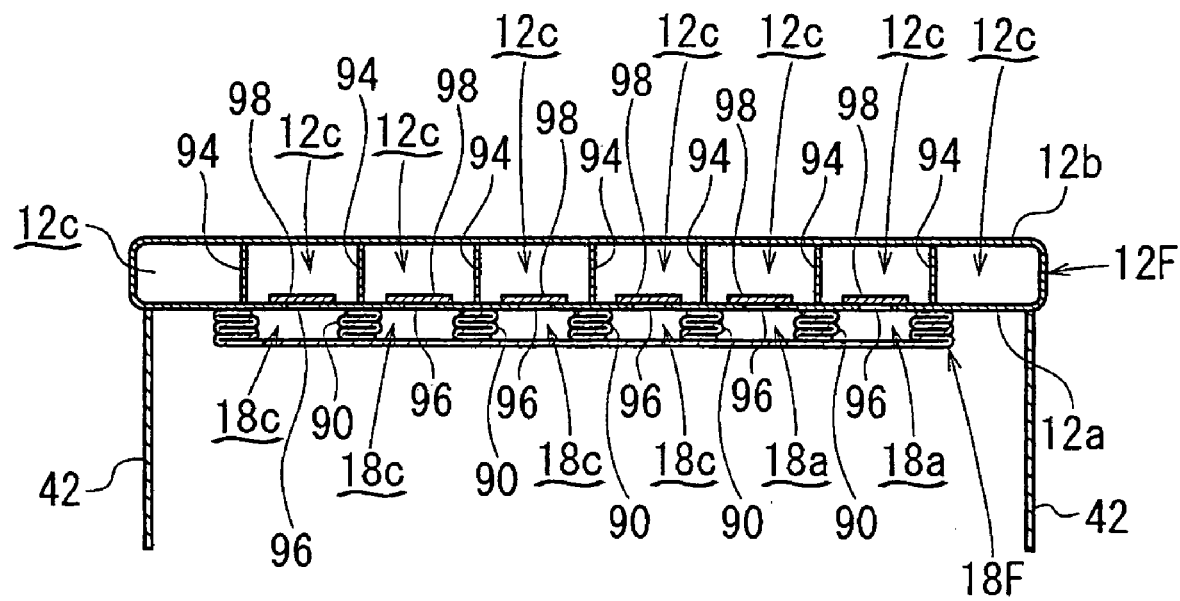

In this invention, when the deployable body itself is formed in a bag shape that can be inflated by gas, the space in the deployable body may also be divided into multiple small chambers, as shown in FIGS. 12 and 13(a) to 13(c). FIG. 12 is a perspective view of an occupant protection system 10F with such a structure with the bag in an inflated state. FIG. 13(a) is a cross-sectional view of the identical part to that shown in FIG. 13(c) with the bag in a non-inflated state. FIG. 13(c) is a cross-sectional view taken along line 13(c)—13(c) in FIG. 12.

In the occupant protection system 10F, a deployable body 12F includes the front panel 12a facing the occupant seated in the rear seat 2 (not shown in FIGS. 12 and 13) and the rear panel 12b, the outer peripheries of which are connected to each other into the form of a flat bag, as in the deployable body 12D of the occupant protection system 10D shown in FIGS. 9(a) to 9(c). In this embodiment, the inner space of the deployable body 12F is divided into multiple (eight in this embodiment) small chambers 12c arranged along the vehicle width. Reference numeral 94 denotes a partition panel that partitions the adjacent small chambers 12c from each other.

The deployable body 12F of this embodiment includes the duct 48 passing through the upper rim and having one end connected to the gas generator 40 through the duct 50. The duct 48 has vent holes (not shown) communicating with the small chambers 12c. The deployable body 12F of this embodiment also includes a bag 18F to be inflated so as to protrude from the front panel 12a toward the occupant by gas. The inner space of the bag 18 is divided into multiple (six also in this embodiment) small chambers 18a with the partition panels 90, as in the bag 18E of the occupant protection system 10E shown in FIGS. 10 and 11.

Figure 13B:
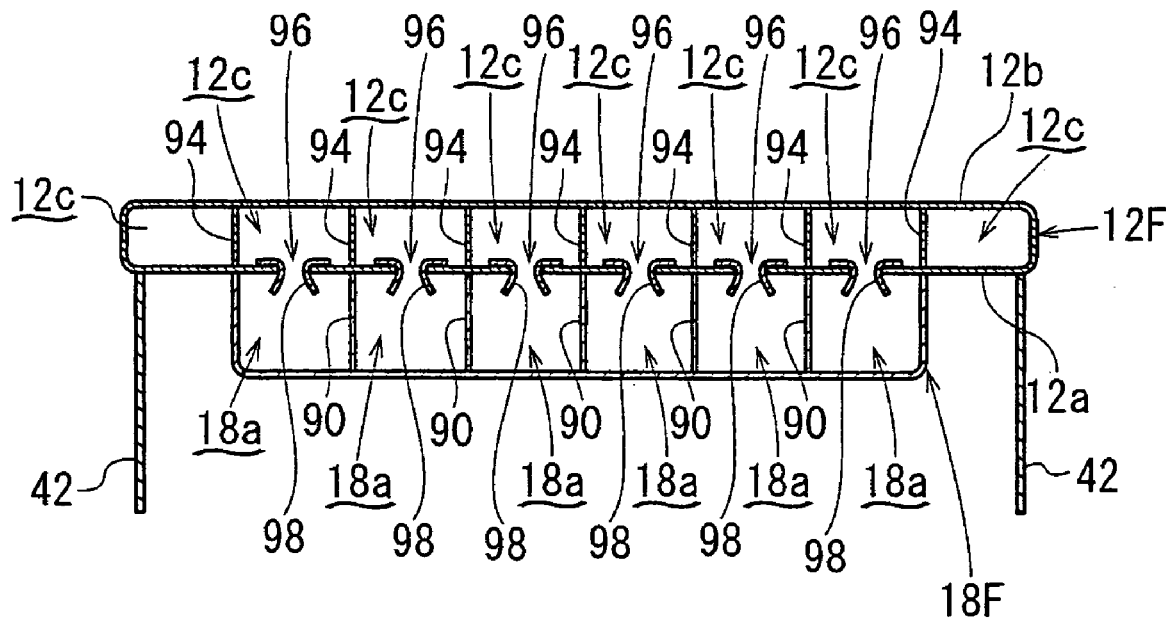

The front panel 12a has gas supply ports 96 that communicate the small chambers 12c of the deployable body 12F with the small chambers 18a of the bag 18F adjacent to each other with the front panel 12a therebetween. As shown in FIG. 13(a), the gas supply ports 96 are each closed with a closing film 98 serving as valve means. The closing film 98 is ruptured to open the gas supply port 96, as shown in FIG. 13(b), when the gas pressure in the small chambers 12c exceeds a specified level. The other structure of the occupant protection system 10F is similar to that of the occupant protection system 10D shown in FIGS. 9(a) to 9(c).

In the occupant protection system 10F as constructed above, when a crash sensor (not shown) detects a car crash, the gas generator 40 immediately operates to emit gas, as in the occupant protection system 10D. Gas emitted from the gas generator 40 is introduced into the small chambers 12c of the deployable body 12F through the duct 48. The deployable body 12F therefore is inflated downwardly from the ceiling 3. At this time, the gas supply ports 96 communicating from the small chambers 12c into the small chambers 18a of the bag 18F are closed with the closing films 98. Accordingly, the small chambers 18a of the bag 18F are not supplied with gas, so that the bag 18F is not inflated, until the small chambers 12c are inflated sufficiently to bring the gas pressure in the small chambers 12c to a specified level, thereby rupturing the closing films 98, i.e. until the deployable body 12F is inflated sufficiently. Accordingly, in the occupant protection system 10F, even if the space between the occupant seated in the rear seat 2 and the front seat 1 ahead of the rear seat 2 (not shown in FIGS. 12 and 13) is narrow, the deployable body 12F can surely enter the space from above.

Subsequently, when the deployable body 12F is inflated sufficiently and so the gas pressure in the small chambers 12c has exceeded a specified level, the closing films 98 are ruptured to open the gas supply ports 96, so that gas flows into the small chambers 18a of the bag 18F through the gas supply ports 96. The bag 18F is thus inflated to protrude toward the occupant, thereby receiving the occupant.

Also in the occupant protection system 10F, the reaction force during reception of the occupant is further reduced by the inflated deployable body 12F. Since the interior of the deployable body 12F and the interior of the bag 18F are divided into the multiple small chambers 12c and 18a, respectively, even if the occupant falls partially onto the bag 18F, the gas in the bag 18F is prevented from flowing out to a portion onto which no occupant falls or into the deployable body 12F, so that the bag 18F can firmly receive the occupant.

In this embodiment, the partition panels 90 and 94 may each have vent holes for communicating the adjacent small chambers 12c and the 18a with each other, respectively. Although this embodiment is constructed such that all of the small chambers 12c of the deployable body 12F are supplied with gas from the common gas generator 40 through the duct 48, the small chambers 12c may each include a gas generator.

Figure 14:
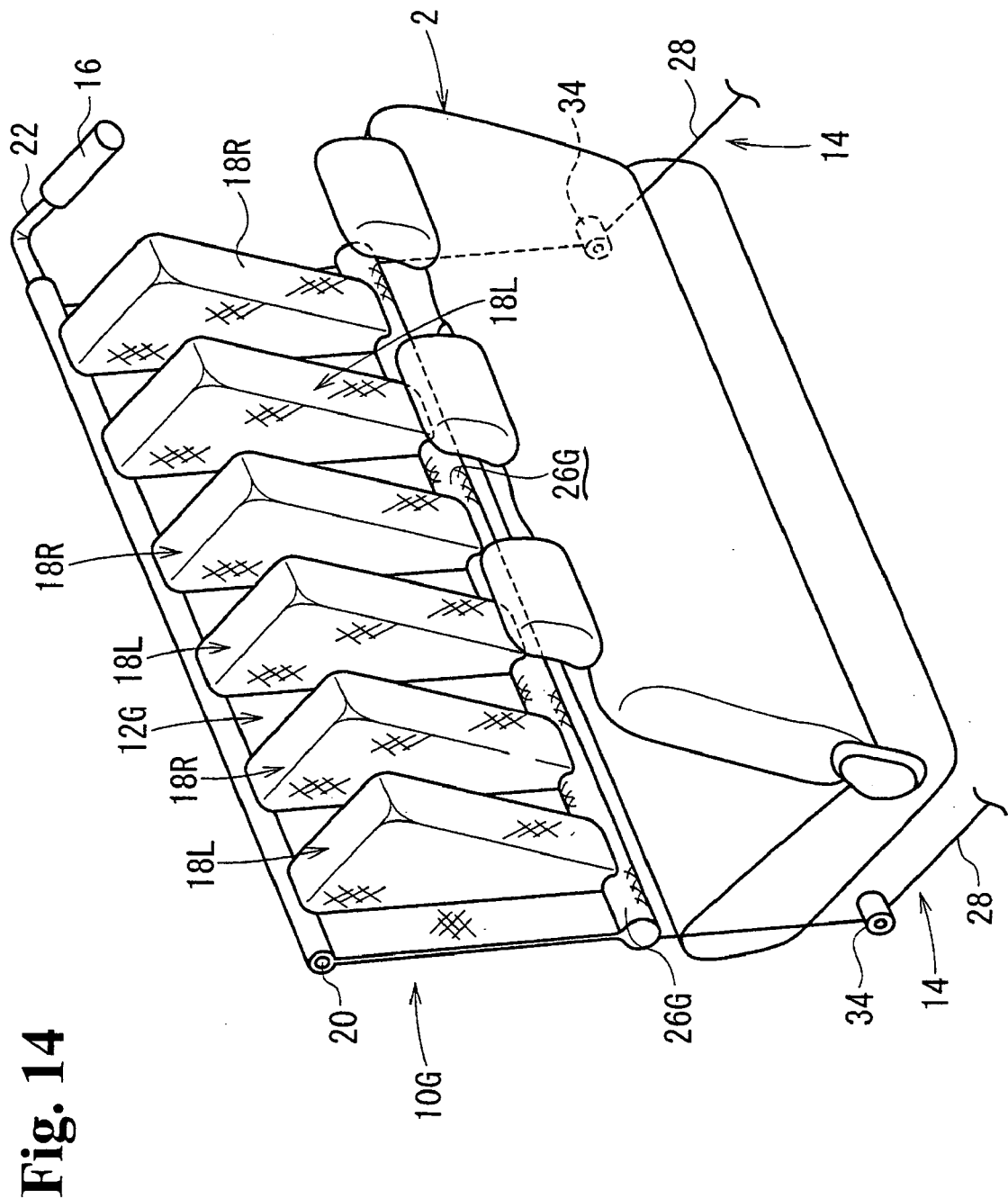
FIG. 14 is a perspective view of an occupant protection system according to a still further embodiment of the present invention in a state that a bag is inflated.

In this invention, the bag for receiving the occupant may be provided for each of the occupants seated side by side. Also, the bag may be arranged to receive only a specified part (for example, shoulders) of the occupant body, as in an occupant protection system 10G shown in FIG. 14. FIG. 14 is a perspective view of an occupant protection system 10G with such a structure with the bag in an inflated state.

As in the occupant protection system 10 shown in FIGS. 1 and 2, the occupant protection system 10G includes a deployable body 12G for deploying downwardly from the ceiling 3 in vertical and lateral directions in the vehicle cabin in the region ahead of the upper body of the occupant seated in the rear seat 2; the draw gear 14 for inflating the deployable body 12G; the gas generator 40, and a controller (not shown) for controlling the operation of the draw gear 14 and the gas generator 40. In the draw gear 14, FIG. 14 shows only the first wire 28 for drawing the deployable body 12G downwardly and the moving pulley 34 over which the first wire 28 is looped.

In this embodiment, three occupants are seated side by side in the rear seat 2. The rear seat 2 is provided for three persons. A pair of left and right bags 18L and 18R to be inflated to protrude from the front surface of the deployable body 12G toward the occupants to receive the occupant by gas from the gas generator 40 is disposed at each of positions of the deployable body 12G facing each of the three occupants seated in the rear seat 2. The left bag 18L is arranged to receive the left shoulder of the occupant and the right bag 18R is arranged to receive the right shoulder. The bags 18L and 18R are placed apart from each other, so that when the bags 18L and 18R receive the occupant's shoulders, a part between the shoulders faces a space between the bags 18L and 18R.

In this embodiment, the deployable body 12G has the upper end joined with the tubular take-up shaft 20 having one end connected to the gas generator 40 through a hollow rotational joint and the duct 22. The take-up shaft 20 has vent holes (not shown) communicating with the bags 18L and 18R. The embodiment also has an oblong bag 26G extending laterally along the lower rim of the deployable body 12G. The lower ends of the bags 18L and 18R communicate with the oblong bag 26G. The other structure of the occupant protection system 10G is similar to that of the occupant protection system 10 shown in FIGS. 1 and 2.

In the occupant protection system 10G with such a structure, in a car crash, the controller first activates the rotation driving unit of the first reel 30 (not shown in FIG. 14) of each draw gear 14. The first reel 30 winds the first wire 28, so that the deployable body 12G is pulled downwardly from the ceiling 3 to deploy toward the front of the rear seat 2. When the deployable body 12G deploys downwardly by a specified length, the controller operates the gas generator 40 to emit gas. Gas emitted from the gas generator 40 is introduced into the bags 18L and 18R through the duct 48, so that the bags 18L and 18R are inflated so as to protrude toward the occupant for receiving the occupant. At this time, the left bag 18L receives the occupant's left shoulder, the right bag 18R receives the occupant's right shoulder, and the part between the shoulders faces the space between the bags 18L and 18R. Accordingly, the reaction force applied to the breastbone and the relatively delicate cervical vertebra can be reduced.

Since this embodiment includes the bags 18L and 18R for each occupant are arranged to face only the neighborhood of the occupant's shoulders, the total volume of the bags 18L and 18R is so small that the gas generator 40 is enough to have a relatively small output. Although this embodiment is constructed such that all of the bags 18L and 18R are supplied with gas from the common gas generator 40 through the duct 48, the bags 18L and 18R may each have a gas generator.

Figure 15:
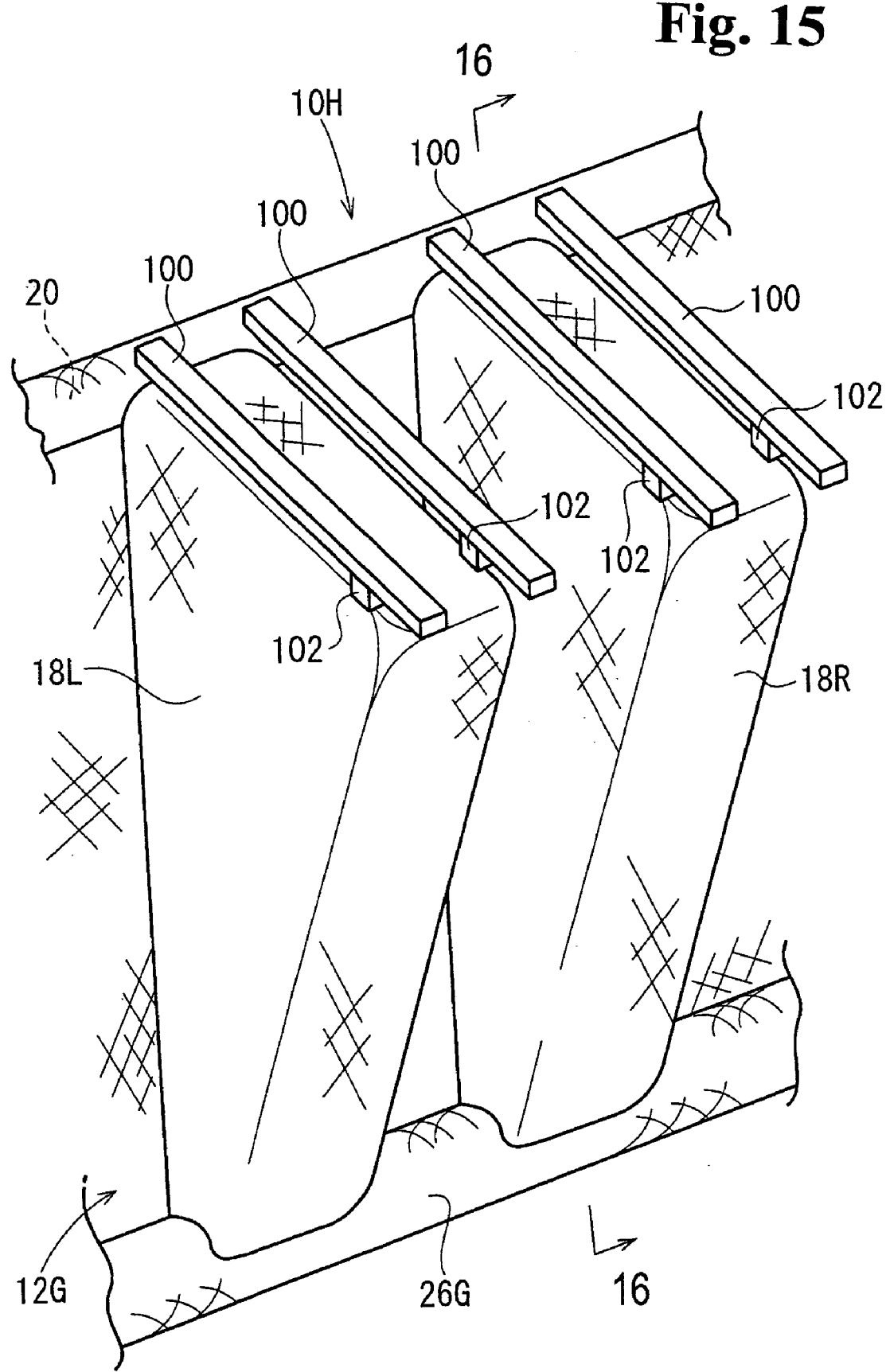
FIG. 15 is a perspective view of an occupant protection system according to a still further embodiment of the present invention in a state that a bag is inflated.
Figure 16:
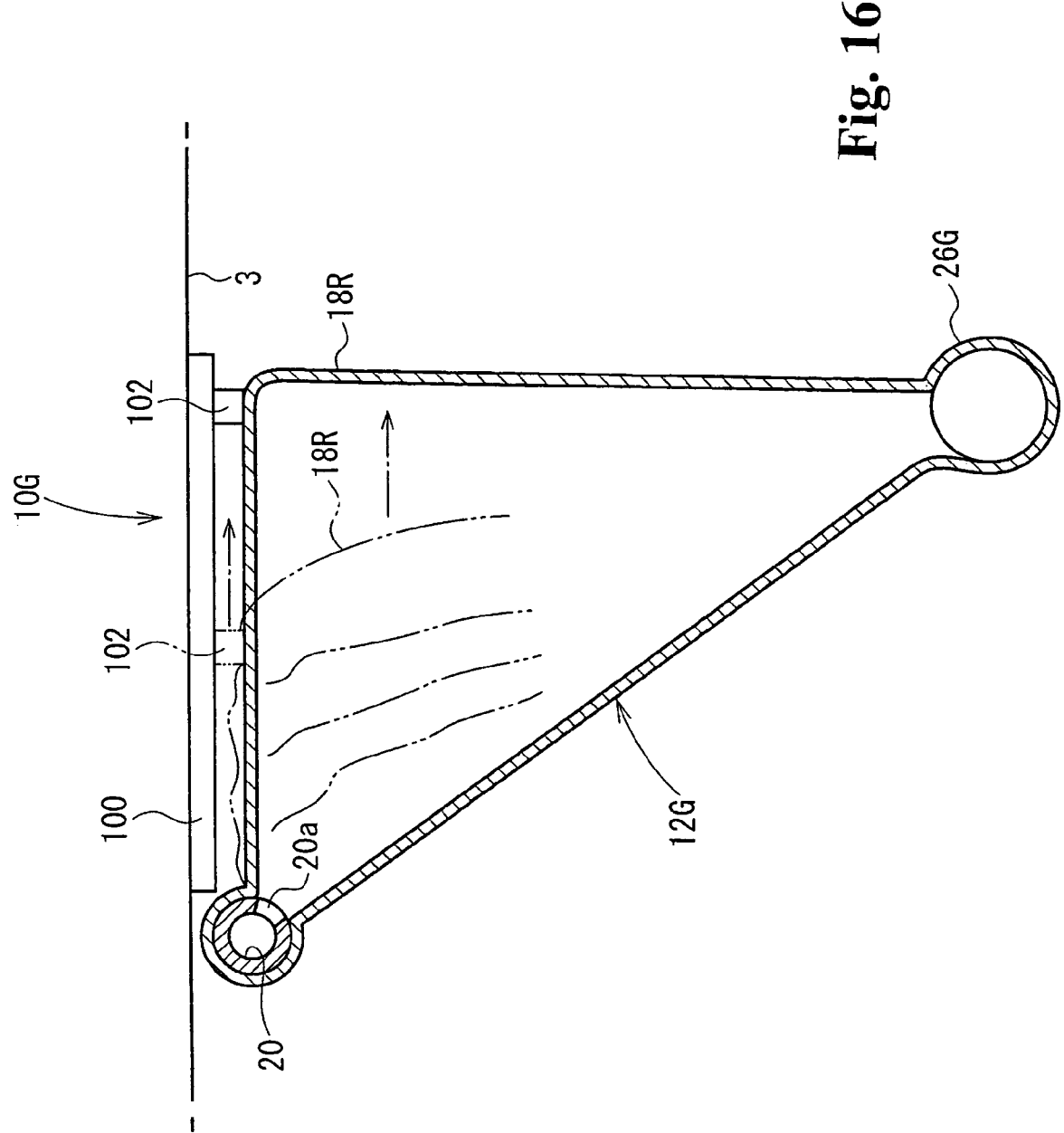
FIG. 16 is a cross-sectional view taken along line 16—16 in FIG. 15.

When the deployable body deploys downwardly from the ceiling of the vehicle cabin, the upper part of the bag inflated from the deployable body adjacent to the occupant may engage the ceiling. Such a structure prevents the inflated bag from retracting from the occupant when the occupant strikes against the bag. FIG. 15 is a perspective view of an occupant protection system 10H with such a structure with the bag in an inflated state. FIG. 16 is a cross-sectional view taken along line 16—16 in FIG. 15.

As in the occupant protection system 10G shown in FIG. 14, the occupant protection system 10H includes the deployable body 12G for deploying downwardly from the ceiling 3 in vertical and lateral directions in the vehicle cabin in the region ahead of the upper body of the occupant seated in a rear seat (not shown) The parts of the deployable body 12G facing the occupants seated side by side in proper positions of the rear seat each has a pair of left and right bags 18L and 18R to be inflated by gas from the gas generator 40 to protrude from the front surface of the deployable body 12G toward the occupant to receive the occupant.

As described above, the left bag 18L is arranged to receive the left shoulder of the occupant and the right bag 18R is arranged to receive the right shoulder. The bags 18L and 18R are placed apart from each other. When the bags 18L and 18R have received the occupant's shoulders, the part between the shoulders faces the space between the bags 18L and 18R. The embodiment also has the oblong bag 26G extending laterally along the lower rim of the deployable body 12G. The lower ends of the bags 18L and 18R communicate with the oblong bag 26G.

Referring to FIG. 16, the bags 18L and 18R are inflated to protrude from the front surface of the deployable body 12G (surface adjacent to the occupant) toward the occupant (rear of the vehicle). The respective end faces (occupant-opposing surfaces) of the bags 18L and 18R form approximately vertical surfaces and the upper surfaces extend approximately horizontally along the ceiling 3.

In this embodiment, the upper end of the deployable body 12G is joined with the tubular take-up shaft 20 having one end connected to the gas generator. The take-up shaft 20 has vent holes 20a communicating with the bags 18L and 18R. The take-up shaft 20 is fixed to the ceiling 3 such that it can rotate around the axis while extending in the direction of the vehicle width along the ceiling 3. The deployable body 12G is wound around the take-up shaft 20 in a non-deployed state. The wound deployable body 12G is covered with a cover (not shown) mounted to the ceiling 3. The cover is constructed to be torn open for allowing the deployment of the deployable body 12G when the deployable body 12 deploys.

As shown in FIG. 15, this embodiment has a pair of guide rails 100 serving as guide member above each of the inflated bags 18L and 18R. The guide rails 100 extend from above the base ends of the bags 18L and 18R toward the rear of the vehicle, that is, in the direction of inflation of the bags 18L and 18R, along the ceiling 3. Each guide rail 100 includes a slider 102 serving as a movable body along the guide rail 100. The slider 102 is connected to the end (adjacent to the occupant) of the upper surface of each of the inflated bags 18L and 18R.

Although not shown, each guide rail 100 has a longitudinal guide groove, in which the slider 102 is slidably fitted. In the embodiment, a saw-tooth section connected to the extension of the guide groove is provided on the sliding surface of the guide groove to the slider 102. The slider 102 has a claw section elastically fitted to the saw-tooth section. The saw-tooth section is constructed to allow the claw section to elastically move over each tooth of the saw-tooth section toward the rear of the vehicle, but to prevent the opposite movement by bringing the tooth of the saw-tooth section into contact with the claw section from the front of the vehicle. That is, a one-way mechanism is formed of the saw-tooth section and the claw section for allowing the movement of the slider 102 along the guide rail 100 toward the rear of the vehicle but preventing the opposite movement.

The saw-tooth section is constructed such that when a specified load or more is applied from the slider 102 through the claw section, the tooth contacting the claw section from the front of the vehicle is plastically deformed to be crushed down by the claw section, thereby allowing the movement of the slider 102 toward the front of the vehicle.

When the bags 18L and 18R are in a non-inflated state, the slider 102 is located in the vicinity of the end of the guide rail 100 adjacent to the front of the vehicle (above the base ends of the bags 18L and 18R). The bags 18L and 18R are in a flatly folded state along the front surface of the deployable body 12G. When the deployable body 12G is in a non-deployed state, the guide rail 100 and the slider 102 are covered with a cover (not shown) mounted to the ceiling 3.

The cover has torn-open portions which are torn open by the sliders 102 when the bags 18L and 18R are inflated to move the sliders 102 along the guide rails 100 toward the rear of the vehicle with the inflation of the bags 18L and 18R. The cover may be integrated with the cover that covers the wound deployable body 12G. The other structure of the occupant protection system 10H is similar to that of the occupant protection system 10G shown in FIG. 14.

In the occupant protection system 10H with such a structure, in the event of a car crash, the deployable body 12G is drawn downwardly from the ceiling 3 toward the front of the rear seat. When the deployable body 12G deploys downwardly by a specified length, the gas generator operates to emit gas. The bags 18L and 18R are inflated to protrude toward the occupant with gas for receiving the occupant. At this time, the left bag 18L receives the occupant's left shoulder, the right bag 18R receives the occupant's right shoulder, and the part between the shoulders faces the space between the bags 18L and 18R. Accordingly, the reaction force applied to the breastbone and the relatively delicate cervical vertebra can be reduced.

In the occupant protection system 10H, when the bags 18L and 18R are inflated, the sliders 102 move along the guide rails 100 toward the rear of the vehicle with the inflation of the bags 18L and 18R. The bags 18L and 18R are therefore guided by the guide rails 100 through the sliders 102 to be surely inflated toward the rear of the vehicle, that is, toward the occupant. Since the inflated bags 18L and 18R engage the ceiling 3 with the sliders 102 and the guide rails 100, the bags 18L and 18R are not retracted from the occupant when the occupant strikes against the bags 18L and 18R. Particularly, since the foregoing one-way mechanism allows the sliders 102 to move in the direction of inflation of the bags 18L and 18R but prevents the opposite movement, the backward movement of the bags 18L and 18R can be surely prevented.

As described above, the saw-tooth section of the one-way mechanism is constructed such that when a specified load is applied from the slider 102 through the claw section of the slider 102, the tooth contacting the claw section from the front of the vehicle is plastically deformed to be crushed down by the claw section, thereby allowing the movement of the slider 102 toward the front of the vehicle. Accordingly, when the occupant strikes against the bags 18L and 18R, the sliders 102 retract toward the front of the vehicle while elastically deforming the teeth of the saw-tooth section by the load from the occupant, thereby absorbing the impact applied from the bags 18L and 18R to the occupant.

Figure 17:
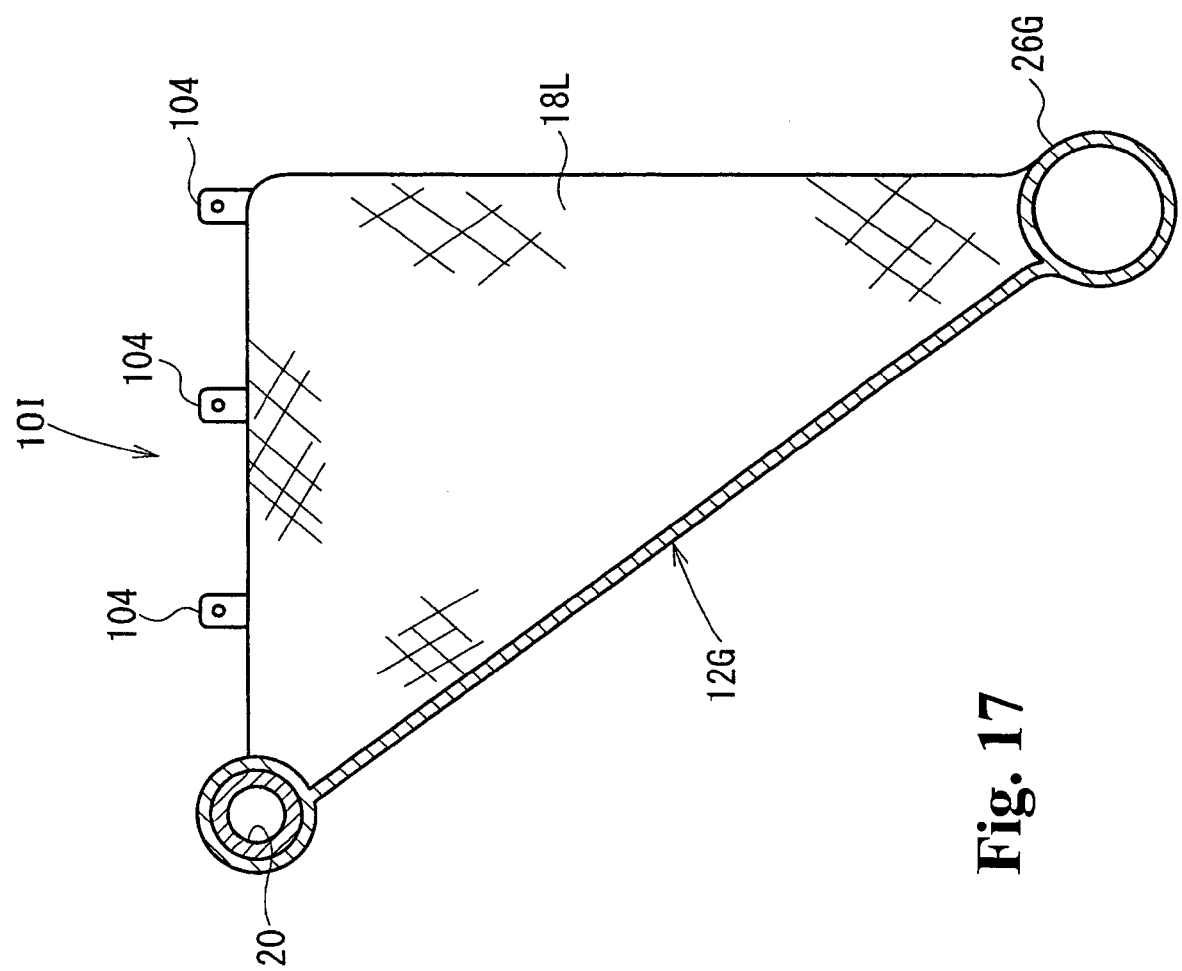
FIG. 17 is a cross-sectional side view of an occupant protection system according to a still further embodiment of the present invention.

In the invention, the structure in which the upper part of the inflated bag adjacent to the occupant engages the ceiling of the vehicle cabin may be a structure other than that of FIGS. 15 and 16. In the invention, the upper part of the inflated bag adjacent to the occupant may engage directly the ceiling of the vehicle cabin. FIG. 17 is a cross-sectional view of an occupant protection system 10I with such a structure, viewed from the side.

In the occupant protection system 10I, projections 104 are provided on the upper surface of each of the bags 18L and 18R (only the left bag 18L shown in FIG. 17) for engaging the bags 18L and 18R with the cabin ceiling (not shown). In this embodiment, the projections 104 are provided at multiple positions (three in this embodiment) from the leading end to the base end in the inflating direction of each of the bags 18L and 18R. Each projection 104 has an insertion hole (reference numeral omitted) for a bolt etc., through which a bolt etc. is passed to engage the projection 104 with the cabin ceiling. The other structure of the occupant protection system 10I is similar to that of the occupant protection system 10G shown in FIG. 14. Reference numerals in FIG. 17 same as those in FIG. 14 indicate the same components.

The occupant protection system 10I can also prevent the bags 18L and 18R from retracting from the occupant when the occupant strikes against the inflated bags 18L and 18R, since the upper surfaces of the bags 18L and 18R engage the cabin ceiling with the projections 104. This embodiment has a simple structure because the upper surfaces of the bags 18L and 18R engage directly the cabin ceiling with the projections 104 projecting from the upper surfaces of the bags 18L and 18R.

Figure 18:
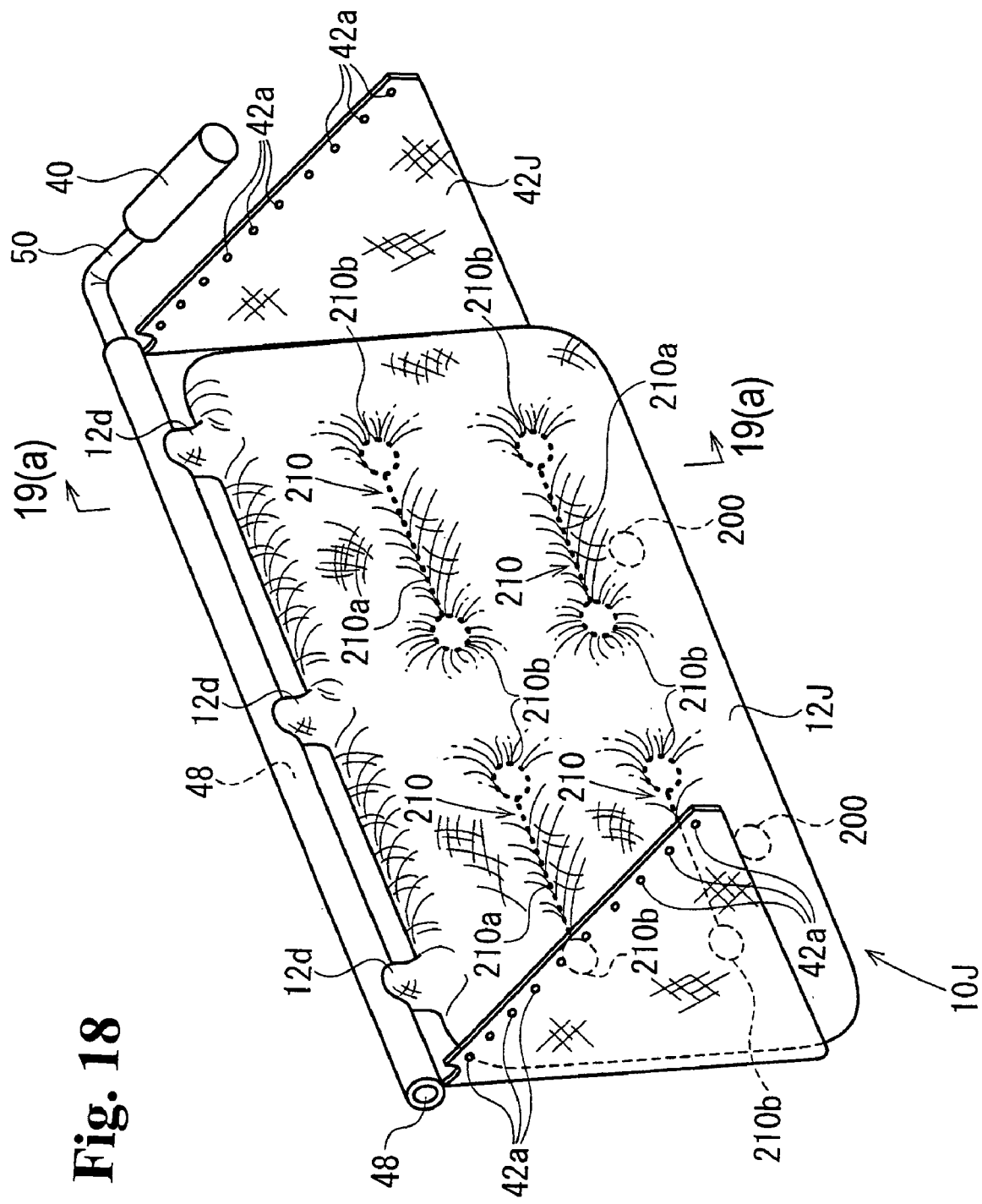
FIG. 18 is a perspective view of an occupant protection system according to a still further embodiment of the present invention in a state that a bag is inflated.
Figure 19A:
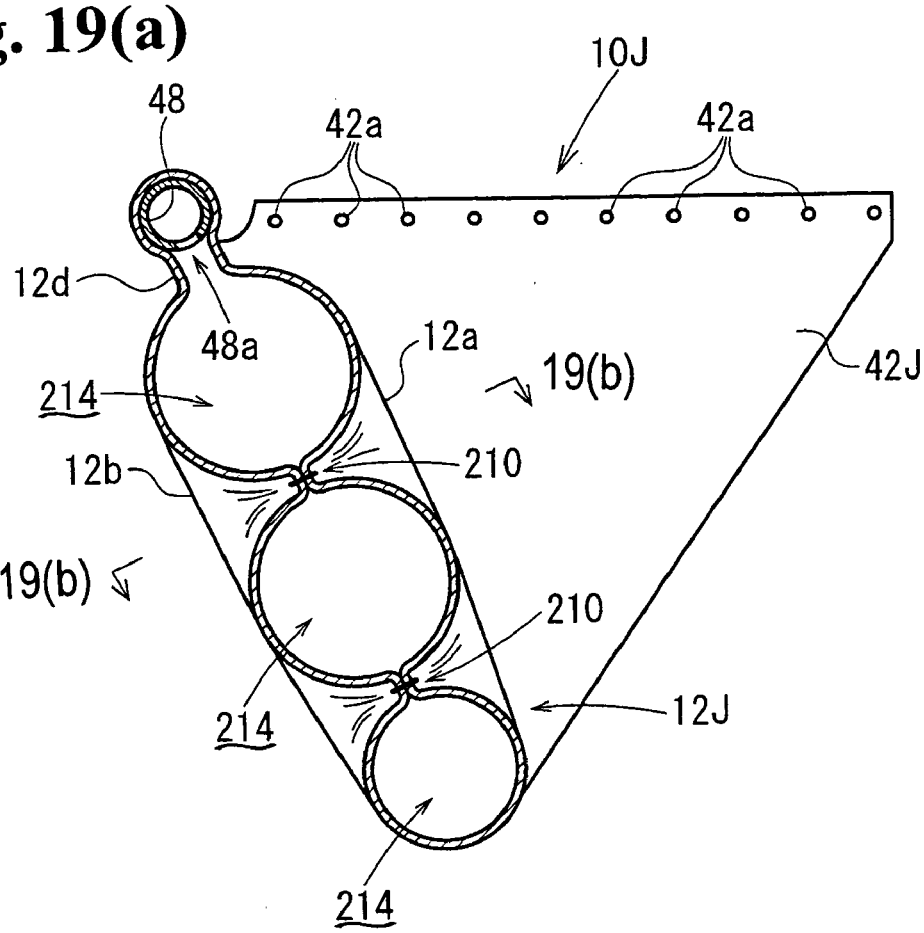
FIGS. 19(a) and 19(b) are cross-sectional views of a deployable body of the occupant protection system shown in FIG. 18.
Figure 19B:
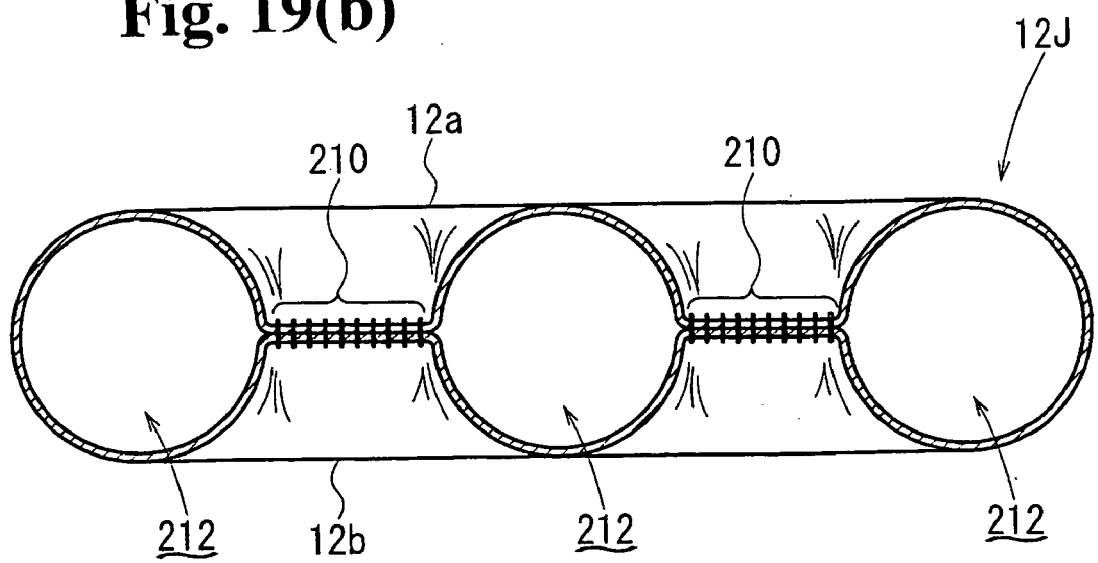

FIG. 18 is a perspective view of an occupant protection system 10J with the deployable body 12 in an inflated state, according to a still further embodiment. FIG. 19(a) is a cross-sectional view taken along line 19(a)—19(a) in FIG. 18. FIG. 19(b) is a cross-sectional view taken along line 19(b)—19(b) in FIG. 19(a).

In the occupant protection system 10J, the deployable body 12J includes the front panel 12a facing the occupant seated in the rear seat (not shown in FIGS. 18 and 19) and the rear panel 12b opposite to the front panel 12a, the outer peripheries of which are connected to each other into a flat bag form. The deployable body 12J can be inflated with gas supplied to the interior thereof to increase in a thickness. The deployable body 12J includes the tubular duct 48 passing through the upper rim. The gas generator 40 is joined to one end of the tubular duct 48 through the duct 50. Gas emitted from the gas generator 40 flows into the deployable body 12J from the vent holes 48a provided in the tubular duct 48 through ducts 12d to inflate the deployable body 12J. The tubular duct 48 is fixed to the cabin ceiling 3 with the long side as the width of the vehicle (in the lateral direction).

In this embodiment, the deployable body 12J is inflated while increasing a thickness, and deploys toward the front of the rear-seat occupant to receive the rear-seat occupant. Briefly, the embodiment is constructed such that the inflated deployable body 12J serves as a bag. The rear panel 12b has the vent hole 200 for discharging gas from the interior of the deployable body 12J to absorb the impact applied to the occupant when the inflated deployable body 12J receives the occupant.

Also in this embodiment, the vent holes 200 are disposed in the lower center of each of the left-half and right-half of the rear panel 12b which constructs the opposite surface from the rear-seat occupant side, as shown in FIG. 18, in other words, in positions where the deployable body 12J faces the lower center of the back of the backrest of each front seat in a fully deployed state, so that the vent holes 200 are not closed by the backrest or the headrest of the front seat, or the body of the rear-seat occupant who falls onto the deployable body 12J, and gas flowing out of the vent holes 200 is not blown not only onto the rear-seat occupant but also onto the front-seat occupant.

In this embodiment, the inflation thickness of the deployable body 12J is limited by partially stitching the front panel 12a and the rear panel 12b together. Reference numeral 210 denotes the connecting portion of the front panel 12a with the rear panel 12b. Specifically, as shown in FIG. 18, two connecting portions 210 are disposed at the same height, in each of the upper and lower lines (four in total). Each connecting portion 210 has a linear connecting portion 210a which connects the front panel 12a and the rear panel 12b laterally and linearly and a pair of circular connecting portions (reinforcing connecting portions) 210b which connect the front panel 12a and the rear panel 12b circularly at opposite ends of the linear connecting portion 210a. The opposite ends of the linear connecting portion 210a each connect to the circular connecting portion 210b.

The connecting portions 210 disposed at the same height have a specified space therebetween and also have a specified space between the opposite ends and the left and right sides of the deployable body 12J. Also between the upper connecting portions 210 and the upper side of the deployable body 12J, between the upper connecting portions 210 and the lower connecting portions 210, and between the lower connecting portions 210 and the lower side of the deployable body 12J are each provided with a specified space.

When the deployable body 12J is inflated, as shown in FIG. 19(b), columnar inflatable portions 212 extending vertically and continuously from the upper side to the lower side of the deployable body 12J are formed between the laterally adjacent connecting portions 210, and between the opposite ends of each connecting portion 210 and the left and right sides of the deployable body 12J. As shown in FIG. 19(a), beam-shaped inflatable portions 214 extending laterally and continuously from one side to the other side of the deployable body 12J are formed between the upper side of the deployable body 12J and the upper connecting portions 210, between the upper connecting portions 210 and the lower connecting portions 210, and between the lower connecting portions 210 and the lower side of the deployable body 12J.

Also in this embodiment, the left and right sides of the deployable body 12J are connected to the left and right sides of the cabin ceiling (not shown) which extend closer to the rear of the vehicle relative to the deployable body 12J, respectively, with joints 42J. As shown in the drawing, the joint 42J of this embodiment is also shaped like a triangular sheet, in which the front rim is connected to the side of the deployable body 12J and the front rim is fixed to the side rim of the cabin ceiling with a fastener (not shown) such as a bolt and a rivet. Reference numeral 42a indicates a hole through which the fastener is passed.

The deployable body 12J of the occupant protection system 10J with such a structure is limited in a thickness during inflation because the front panel 12a and the rear panel 12b are joined together with the connecting portions 210. Accordingly, even if the space ahead of the rear-seat occupant is narrow, the deployable body 12J can enter the space to inflate therein. Since the inflation thickness of the deployable body 12J is limited, the deployable body 12J can be inflated quickly. The inflated deployable body 12J becomes tightened by the limitation in the inflation thickness, thereby firmly receiving the occupant.

Particularly, in this embodiment, when the deployable body 12J is inflated, three columnar inflatable portions 212 are formed and extend vertically and continuously from the upper side to the lower side of the deployable body 12J, and also three beam-shaped inflatable portions 214 are formed and extend laterally and continuously from one side to the other side of the deployable body 12J, as described above. The inflated and deployed deployable body 12J therefore has high rigidity throughout vertically and laterally, thereby preventing buckling. Since the inflated and deployed deployable body 12J does not buckle easily, as described above, the retraction of the deployable body 12J toward the front of the vehicle when the occupant falls onto the deployable body 12J is effectively prevented with the joints 42J which connect the left and right sides of the deployable body 12J to the cabin ceiling.

Figure 20:
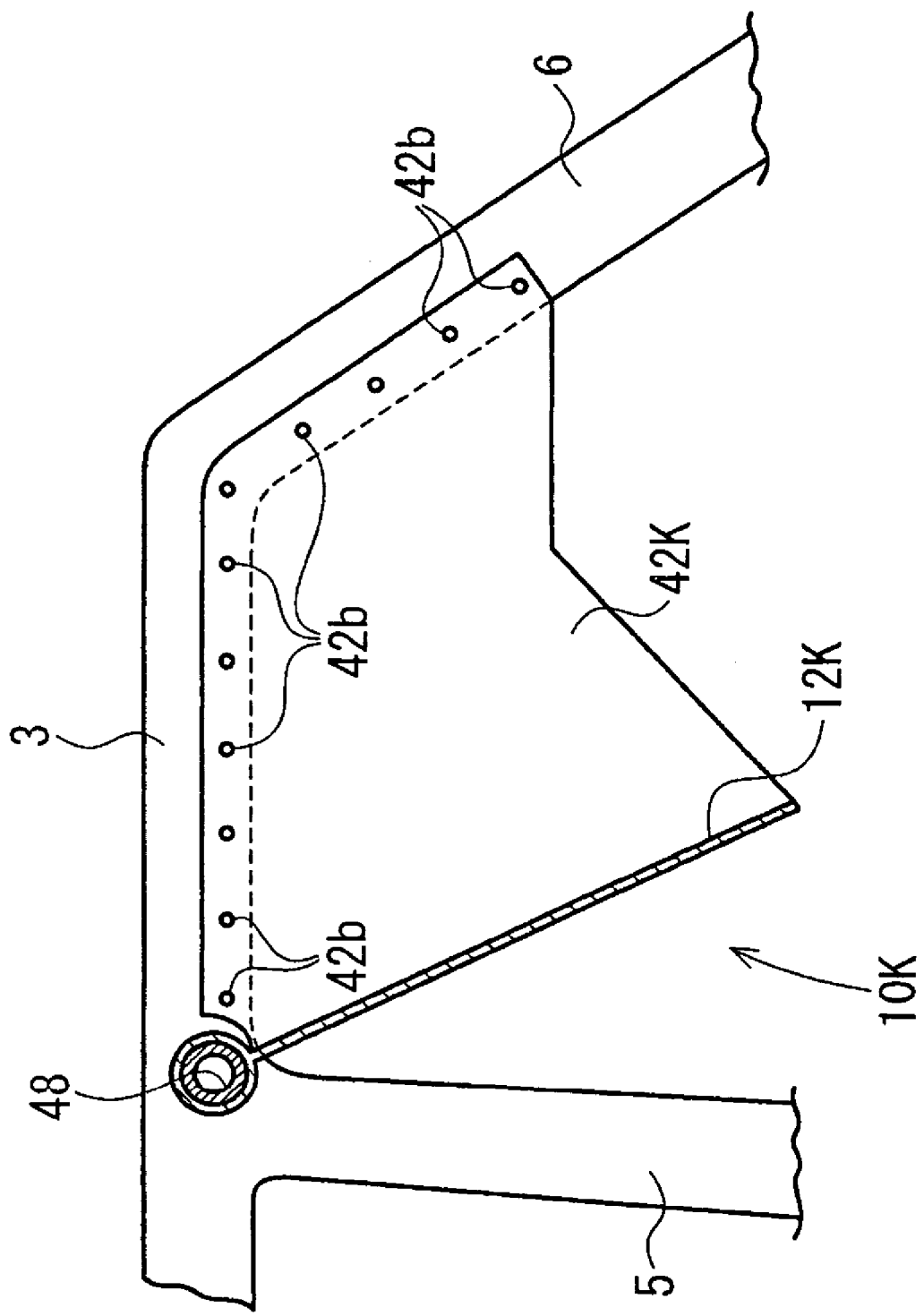
FIG. 20 is a longitudinal sectional view of an occupant protection system according to a still further embodiment of the present invention.

FIG. 20 is a longitudinal sectional view of an occupant protection system 10K, with the deployable body in a deployed state, according to a still further embodiment of the present invention. In the occupant protection system 10K, the deployable body 12K deploys from the ceiling 3 downwardly. Reference numeral 48 indicates a tubular duct connected to the upper rim of the deployable body 12K. The tubular duct 48 is disposed between the upper ends of the left and right B-pillars of the vehicle with the long side as the vehicle width (in the lateral direction) and fixed to the cabin ceiling 3.

In this embodiment, the left and right sides of the deployable body 12K are connected to the left and right side rims of the cabin ceiling 3 which extend closer to the rear of the vehicle relative to the tubular duct 48 (B-pillar 5) and to left and right C-pillars 6, respectively, with the joints 42K. As shown in the drawing, each C-pillar 6 is disposed closer to the rear of the vehicle relative to the B-pillar 5 and extends approximately vertically. The upper end of the C-pillar 6 is connected to the rear end of the side rim of the cabin ceiling 3.

The joint 42K of this embodiment is also shaped like a sheet. The front rim of the joint 42K is joined with the side of the deployable body 12K, the upper rim thereof is retained along the side rim of the cabin ceiling 3, and the rear rim thereof is retained along the C-pillar 6. Reference numeral 42b indicates a fastener such as a bolt and a rivet, which retains the upper rim and the rear rim of the joint 42K to the side rim of the cabin ceiling 3 and the C-pillar 6.

In a normal condition, as the deployable body 12K is folded, the joint 42K is folded so as to extend in a long shape along the side rim of the cabin ceiling 3 and the C-pillar 6 connected thereto and is covered with a cover (not shown) mounted to the cabin ceiling 3 and the C-pillar 6. In an emergency such as a car crash, the joints 42K deploy downwardly along the sides of the vehicle while tearing open the cover as the deployable body 12K deploys downwardly from the cabin ceiling 3.

In the occupant protection system 10K, the side of the deployable body 12K is connected to the side rim of the cabin ceiling 3 extending closer to the rear of the vehicle relative to the deployable body 12K and to the C-pillar 6 extending from the rear end of the side rim approximately vertically with the joint 42K. This effectively prevents the deployable body 12K from retracting toward the front of the vehicle when the occupant falls onto the deployed deployable body 12K.

The embodiments explained above are merely examples of the present invention and the invention is not limited to the embodiments. For example, the foregoing embodiments are application examples of the invention to the occupant protection system for the automobile rear seats. The invention, however, can be applied to any other occupant protection systems for other seats. The occupant protection system of the invention can be applied not only to seats for multiple occupants but also to a seat for one person.

The disclosures of Japanese Patent Applications No. 2003-204682, No. 2003-340823, and No. 2004-125682 have been incorporated in the application.

While the invention has been explained with reference to the specific embodiments of the invention, the explanation is illustrative and the invention is limited only by the appended claims.

What is claimed is:

1. An occupant protection system for protecting an occupant, comprising:
   a gas generator for ejecting gas,
   a tubular duct connected to the gas generator and extending above a vehicle cabin to cross in a width direction thereof, said tubular duct having a plurality of vent holes oriented downwardly therefrom, and
   a deployable body for deploying downwardly from above into the vehicle cabin in a vertically and laterally deployed state, said deployable body comprising a bag to be inflated to a predetermined size for receiving the occupant after the bag deploys downwardly by a predetermined length, said bag including a plurality of ducts connected to and communicating with the respective vent holes of the tubular duct, columnar inflatable portions extending vertically to directly communicate with the respective ducts, and beam-shaped inflatable portions extending laterally to intersect and communicate with the columnar inflatable portions so that the deployed body extends vertically by the columnar inflatable portions immediately when the gas is ejected to the deployed body, and then the bag is inflated.

2. An occupant protection system according to claim 1, further comprising inflation-thickness limitation means for limiting a thickness of the bag when the bag is inflated.

3. An occupant protection system according to claim 1, further comprising a joint for joining left and right sides of the deployable body with left and right side rims of the cabin ceiling extending toward a rear of the vehicle relative to the deployable body or portions connected to the left and right side rims.

4. An occupant protection system according to claim 1, wherein said bag includes a vent hole for discharging gas from the bag.

5. An occupant protection system according to claim 1, wherein said deployable body comprises front and rear panels joined together at peripheries thereof, and connecting portions at middle area thereof.

6. An occupant protection system according to claim 5, wherein said connecting portions connect the front and rear panels, and extend laterally to space apart vertically and laterally to define the columnar inflatable portions and beamshaped inflatable portions.

7. An occupant protection system according to claim 6, wherein each of the connecting portions includes a linear connecting portion and circular connecting portions at two end of the linear connecting portion.

* * * * *